United States Patent [19]

Ishii et al.

[11] Patent Number: 5,115,172
[45] Date of Patent: May 19, 1992

[54] PHASE LOCKED LOOP SPEED CONTROL CIRCUIT FOR CONTROLLING SPEEDS AND RELATIVE POSITIONS OF OBJECTS

[75] Inventors: Hiroshi Ishii; Masaaki Ozaki, both of Nara, Japan

[73] Assignee: Sharp Kabushiki Kaisha, Japan

[21] Appl. No.: 523,432

[22] Filed: May 15, 1990

[30] Foreign Application Priority Data

May 22, 1989 [JP] Japan ................................ 1-129371

[51] Int. Cl.⁵ .............................................. H01P 5/00
[52] U.S. Cl. .................................... 318/38; 388/911; 388/921
[58] Field of Search ................ 318/595, 119, 616–618, 318/625, 638, 652, 683, 35, 41, 47, 50, 49, 52, 59, 55, 66, 69, 74, 77, 81, 85, 268, 38, 67, 70, 687, 606, 609, 807, 809, 437; 388/812, 813, 820, 911

[56] References Cited

U.S. PATENT DOCUMENTS

| 288,440 | 12/1988 | Ishii et al. | |
|---|---|---|---|
| 3,671,728 | 6/1972 | Day et al. | 318/605 |
| 3,883,785 | 5/1975 | Fulcher et al. | 318/254 |
| 4,381,478 | 4/1983 | Saijo et al. | 318/687 |
| 4,588,936 | 5/1986 | Itoh et al. | 318/603 |
| 4,837,492 | 6/1989 | Kurosawa et al. | 318/661 |
| 4,841,202 | 6/1989 | Dishner et al. | 318/11 |

OTHER PUBLICATIONS

Patent Abstracts of Japan-corresponding to Japanese Patent Application 60-136730, laid open on Jul. 20, 1985.

*Primary Examiner*—William M. Shoop, Jr.
*Assistant Examiner*—A. Jonathan Wysocki
*Attorney, Agent, or Firm*—Nixon & Vanderhye P.C.

[57] ABSTRACT

The invention concerns a phase locked loop speed control circuit for controlling the speeds of two or more objects. It includes pulse generators for generating reference pulses, first counters for counting each of these reference pulses, encoders for detecting relative travelling distances of the objects, second counters for counting encoder pulses from the encoders, first subtracters for subtracting the outputs of the second counters from those of the first counters, second subtractors for subtracting the encoder pulses from the reference pulses, corrector sections for correcting the differences output by the first and the second subtractors, and adjusting sections for adjusting the movements of the objects based on the corrected differences.

10 Claims, 24 Drawing Sheets

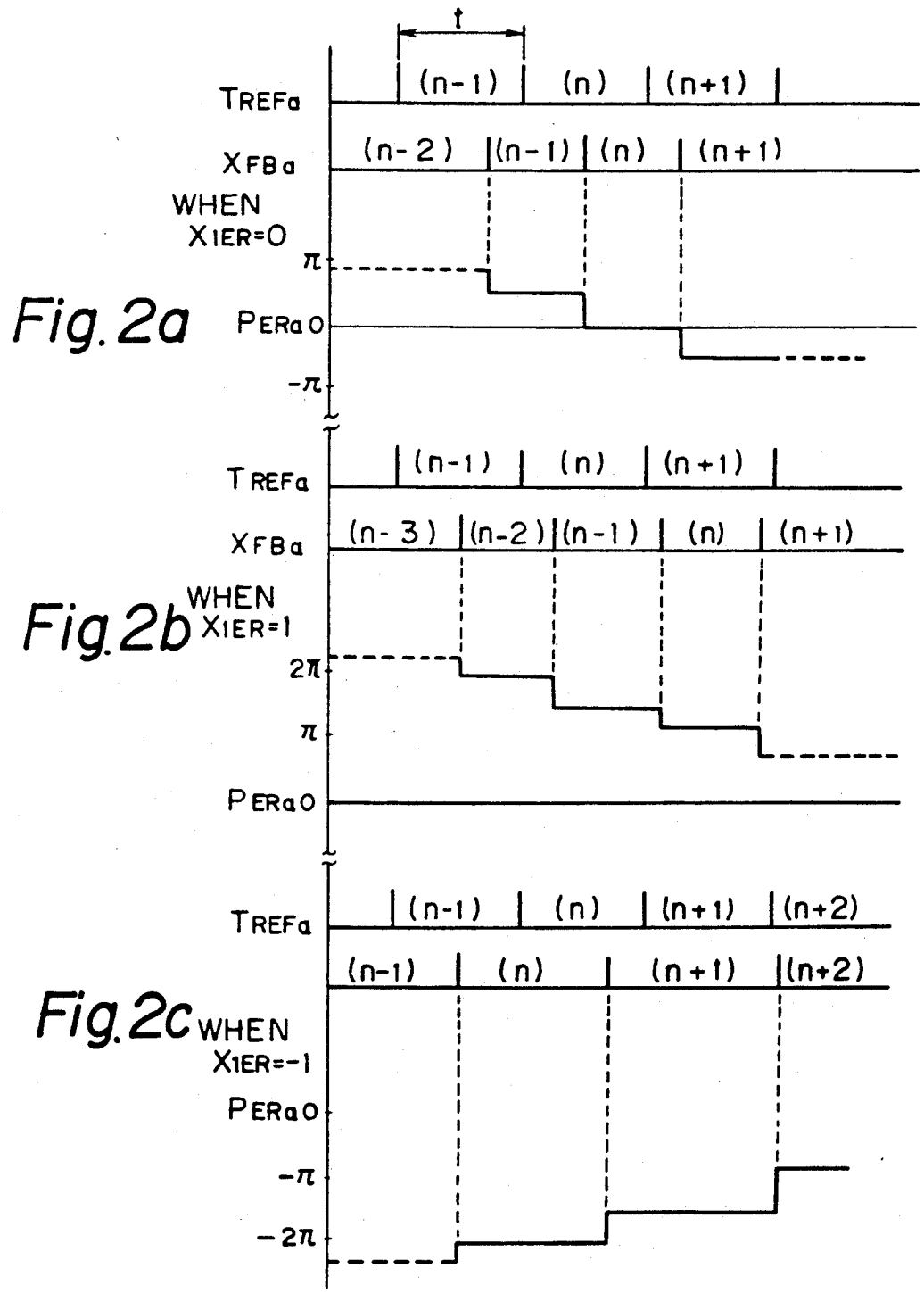

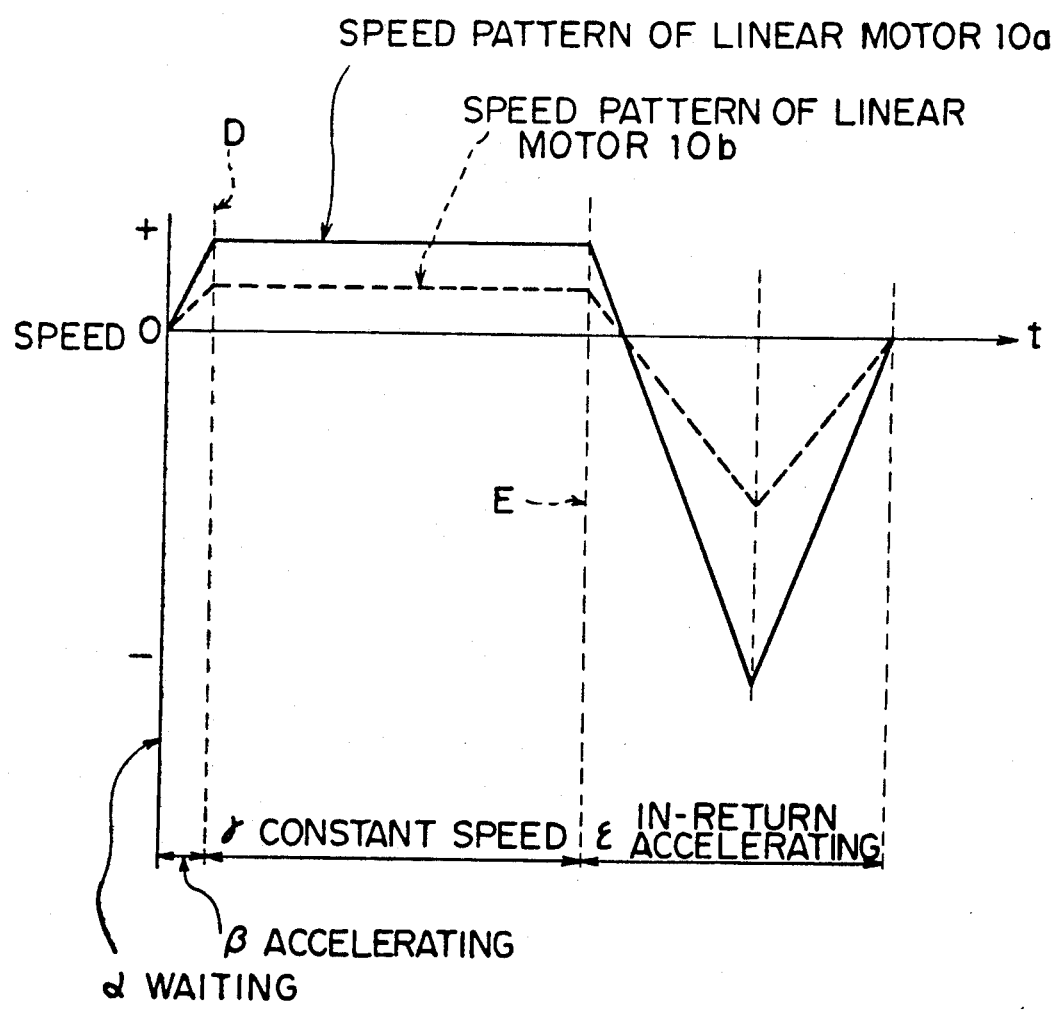

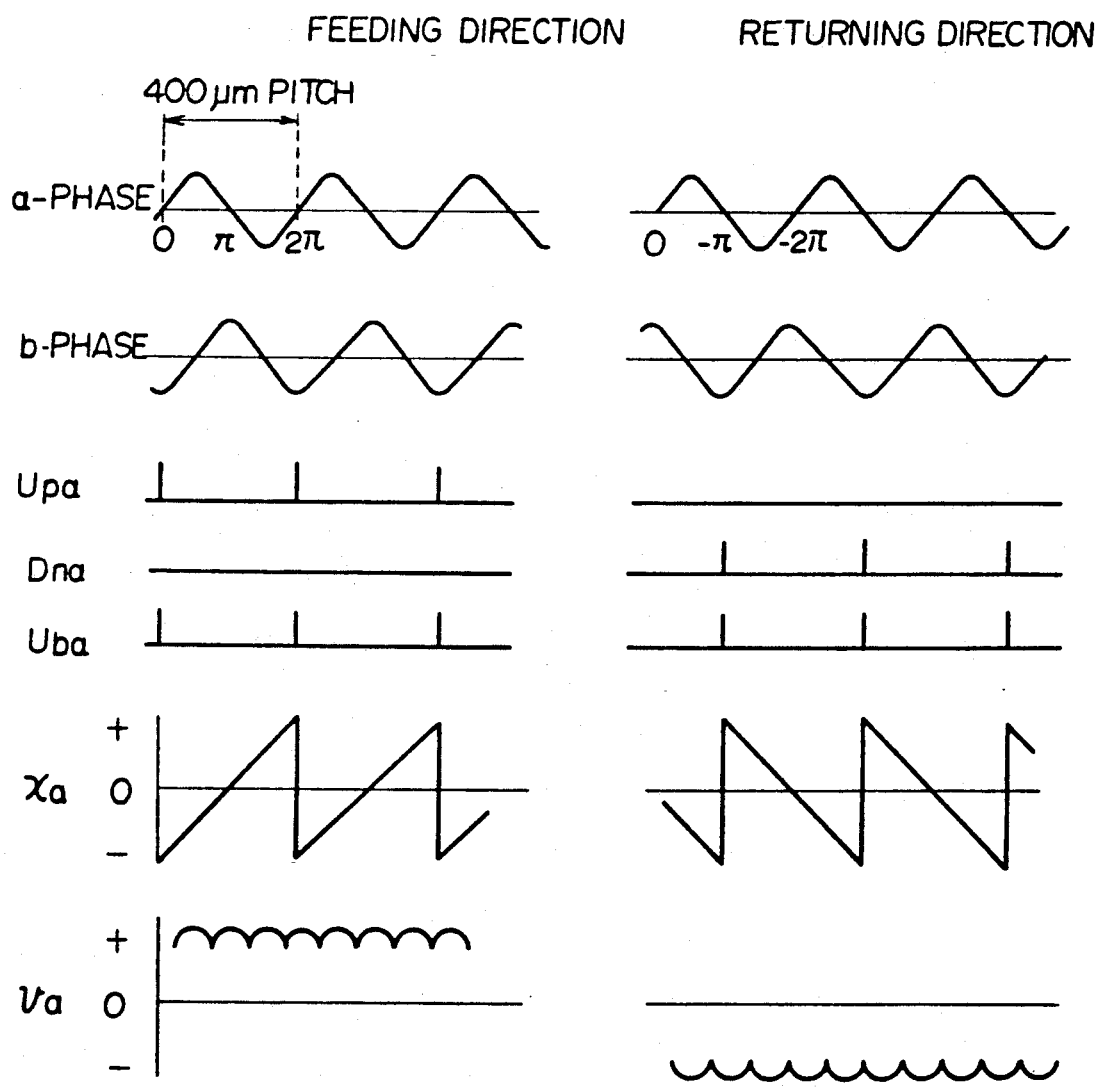

PHASE LOCKED LOOP SPEED CONTROL CIRCUIT FOR CONTROLLING SPEEDS AND RELATIVE POSITIONS OF OBJECTS

BACKGROUND OF THE INVENTION

1. Field of the Invention

The present invention relates to a PLL (Phase Locked Loop) speed control circuit which serves to control two or more objects based on a predetermined speed ratio.

2. Description of the Related Art

As an example, an electronic duplicating machine employing two or more document platforms requires the circuit for controlling two or more objects at a predetermined speed. This type of electronic duplicating machine is required to keep constant an optical distance from a document surface to a photosensitive drum irrespective of the scanning position. It, of course, includes a first mirror platform mounting a light source for radiating light on a document and a second mirror platform mounting a light mirror and a lens for guiding the light reflected from the document surface to the photosensitive drum. The former platform is adapted to be driven in the document-scanning direction at a speed twice as fast as the latter one. Traditionally, the travelling speeds of both platforms have been mechanically arranged to be a ratio of 2 to 1. That is, a wire-pulley mechanism has been used for the arrangement so that a rotary motor connected to the wire pulley is controlled to drive the first and the second mirror platforms at a ratio of 2 to 1. This wire-pulley mechanism disadvantageously cannot adapt to a high-speed-driven electronic duplicating machine, because the mechanism entails an elastic material, that is, a wire included in a transmission system for the driving force. In order to overcome this disadvantage, the newly-developed electronic duplicating machine has employed two linear motors This type of duplicating machine includes two PLL speed control circuits. These circuits serve to control the two linear motors so that these motors can stably drive the first mirror platform at a speed twice as fast as the second mirror platform, respectively.

The foregoing art is, however, designed to allow two PLL speed control circuits to respectively control the linear motors. It brings about the following disadvantage. That is, though the art is able to properly control the speeds of the linear motors, it does not offer an automatic modification function of any slippage caused about the positional relation between the first and the second mirror platforms, that is, an optical distance between the document surface and the photosensitive drum, which slippage results in shifting a duplicated image out of focusing. This is because these linear motors are individually arranged in speed and phase so that they disallow those platforms to return to their proper tracking positions even if they are shifted out of their locking ranges. It will be easily understood that this adverse effect increases more as time passes.

The electronic duplicating machine employing two linear motors is, in essence, suitable for a high-speed-driven machine, but has the foregoing great disadvantage which becomes an obstacle of upgrading the performance of the electronic duplicating machine.

SUMMARY OF THE INVENTION

It is therefore an object of the present invention to provide a PLL speed control circuit which is capable of controlling first and second objects at a predetermined speed ratio as well as driving these objects in synchronization.

In carrying out the foregoing and other objects, a PLL speed control circuit, as shown in FIGS. 1A and 1B, comprises a clock pulse generator 1 for generating a clock pulse T, the clock pulse T being assumed as a time base in controlling each speed of objects 10a, 10b, reference pulse generators 2a, 2b for dividing the clock pulse T output from the clock pulse generator and respectively generating reference pulses $T_{REFa}$, $T_{REFb}$ in a manner to match to each desired speed of the objects 10a, 10b, stroke position instruction sections 3a, 3b for respectively counting the reference pulses $T_{REFa}$, $T_{REFb}$ output from the reference pulse generators 2a, 2b, linear encoders 4a, 4b for respectively detecting each relative travelling distance of the objects 10a, 10b, stroke instruction detecting sections 5a, 5b for respectively counting encoder pulses $X_{FBa}$, $X_{FBb}$, position deviation deriving sections 6a, 6b for respectively comparing each digital value counted by the stroke position detecting sections 5a, 5b with each digital value counted by the stroke position instruction sections 3a, 3b, phase-difference deriving sections 7a, 7b for respectively deriving each phase difference between the reference pulses $T_{REFa}$ and $T_{REFb}$ or between the encoder pulses $X_{FBa}$ and $X_{FBb}$, phase difference correcting sections 8a, 8b for respectively operating the equations of $2\pi X_{1ER}+P_{1ER}$ and $2\pi X_{2ER}+P_{2ER}$, where $X_{1ER}$ and $X_{2ER}$ denote the digital values of position deviations respectively derived by the position deviation deriving sections 6a, 6b and $P_{1ER}$ and $P_{2ER}$ denote the phase differences respectively derived by the phase difference deriving sections 7a, 7b, and adjusting sections 9a, 9b for respectively adjusting each control amount of the objects 10a, 10b based on the derived values of the phase difference correcting sections 8a, 8b.

In operation, at first, the circuit for controlling a speed of the object 10a (control section A for the first object) will be described with reference to FIG. 1A. The clock pulse generator serves to output a clock pulse T to the reference pulse generator 2a at which the clock pulse T is divided at a dividing ratio matched to a desired speed of the object 10a. The stroke position instruction section 3a serves to count the divided reference pulse $T_{REFa}$. The counted digital value is assumed as data indicating a desired stroke position of the object 10a.

The linear encoder 4a, on the other hand, serves to detect a relative travelling distance of the object 10a and supply the encoder pulse $X_{FBa}$ to the stroke position detecting section 5a in which the pulse $X_{FBa}$ is counted. The counted digital value is assumed as data to be a current stroke position of the object 10a. The position deviation deriving section 6a serves to subtract the data about the current stroke position from the data about the desired stroke position and then supply the resulting position-deviation digital value $X_{1ER}$. This digital value is assumed as data indicating the position deviation of the object 10a.

Further, the reference pulse $T_{REFa}$ and the encoder pulse $X_{FBa}$ are led to the phase-difference deriving section 7a in which a phase difference between both pulses is derived. The phase difference is supplied as a number of clock pulse T, which is supplied as data $P_{1ER}$ to the phase-difference correcting section 8a in which the equation of $2\pi X_{1ER}+P_{1ER}$ $(=P_{ERa})$ is operated.

FIGS. 2a to 2c are timing charts showing $T_{REFa}$, $X_{FBa}$, and $P_{ERa}$ assumed when the position-deviation digital value $X_{1ER}$ is 0, 1, or −1, respectively. As shown in FIGS. 2a to 2c, the parentheses are given to indicate how the reference pulse $T_{REFa}$ is phase-shifted from the encoder pulse $X_{FBa}$ for convenience and t denotes a pulse time width of the reference pulse $T_{REFa}$.

FIG. 2a shows the state in which the encoder pulse $X_{FBa}$ does not reach a point t based on the reference pulse $T_{REFa}$. In this case, since the position deviation digital value $X_{1ER}$ is zero, $P_{ERa}$ results in giving $P_{ERa} = 2\pi.0 P_{1ER}$.

FIG. 2b shows the state in which the encoder pulse $X_{FBa}$ reaches a point between t to 2t based on the reference pulse $T_{REFa}$. In this case, since the position-deviation digital value $X_{1ER}$ is one (1), $P_{ERa}$ results in giving $P_{ERa} = 2\pi.1 + P_{1ER}$. That is, $P_{ERa}$ is $P_{1ER}$ plus $2\pi$.

FIG. 2c shows the state in which the encoder pulse $X_{FBa}$ is delayed by t to 2t based on the reference pulse $T_{REFa}$. In this case, since the position-deviation digital value $X_{1ER}$ is −1, $P_{ERa}$ results in giving $P_{ERa} = 2\pi.(-1) + P_{1ER}$. That is, $P_{ERa}$ is $P_{1ER}$ plus $-2\pi$.

When the position-deviation digital value $X_{1ER}$ is an integer n, $P_{ERa}$ results in giving $P_{ERa} = 2\pi n + P_{1ER}$.

$P_{ERa}$ means the data indicating a magnitude of an absolute phase difference between the reference pulse $T_{REFa}$ and the encoder pulse $X_{FBa}$. This data is supplied as a feedback amount to the adjusting section 9a for adjusting the control amount of the object 10a. Hence, a magnitude of an absolute phase difference between the reference pulse $T_{REFa}$ and the encoder pulse $X_{FBa}$ is reduced to zero.

The circuit for controlling a speed of the object 10b (Control section B for controlling the object), as shown in FIG. 1B, has the same arrangement as the foregoing control section A. Hence, no description will be directed to the control section B. Yet, the clock generator 1 is commonly used for the control sections A and B, so that no time shift is brought about between the reference pulses $T_{REFa}$ and $T_{REFb}$, resulting in driving the objects 10a and 10b at a predetermined speed ratio in synchronization.

As has been understood from the above description, the PLL speed control circuit of the invention is designed to generate the first and the second reference pulses assumed as the desired speeds or the reference phases of the first and the second objects based on the clock pulse generated in the clock pulse generator and reduce each phase difference between the first or the second reference pulse and the first or the second encoder pulse to zero in the returning process irrespective of any magnitude of the phase difference. The PLL speed control circuit, thus, makes it possible to drive the first and the second objects at a predetermined speed ratio and in synchronization. It results in improving circuit efficiency and expanding the scope of the circuit.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 2a to 2c are timing charts showing essential data and signals for describing an operating principle of the PLL speed control circuit;

FIG. 7 is a graph showing a speed pattern characteristic of each linear motor;

FIGS. 9a and 9b are timing charts showing essential signals used in the PLL speed control circuit;

DESCRIPTION OF THE PREFERRED EMBODIMENTS

Hereinafter, a detailed description will be directed to an electronic duplicating machine employing a fixed document platform to which machine a preferred embodiment of a PLL speed control circuit according to the invention is applied.

Figure 3:
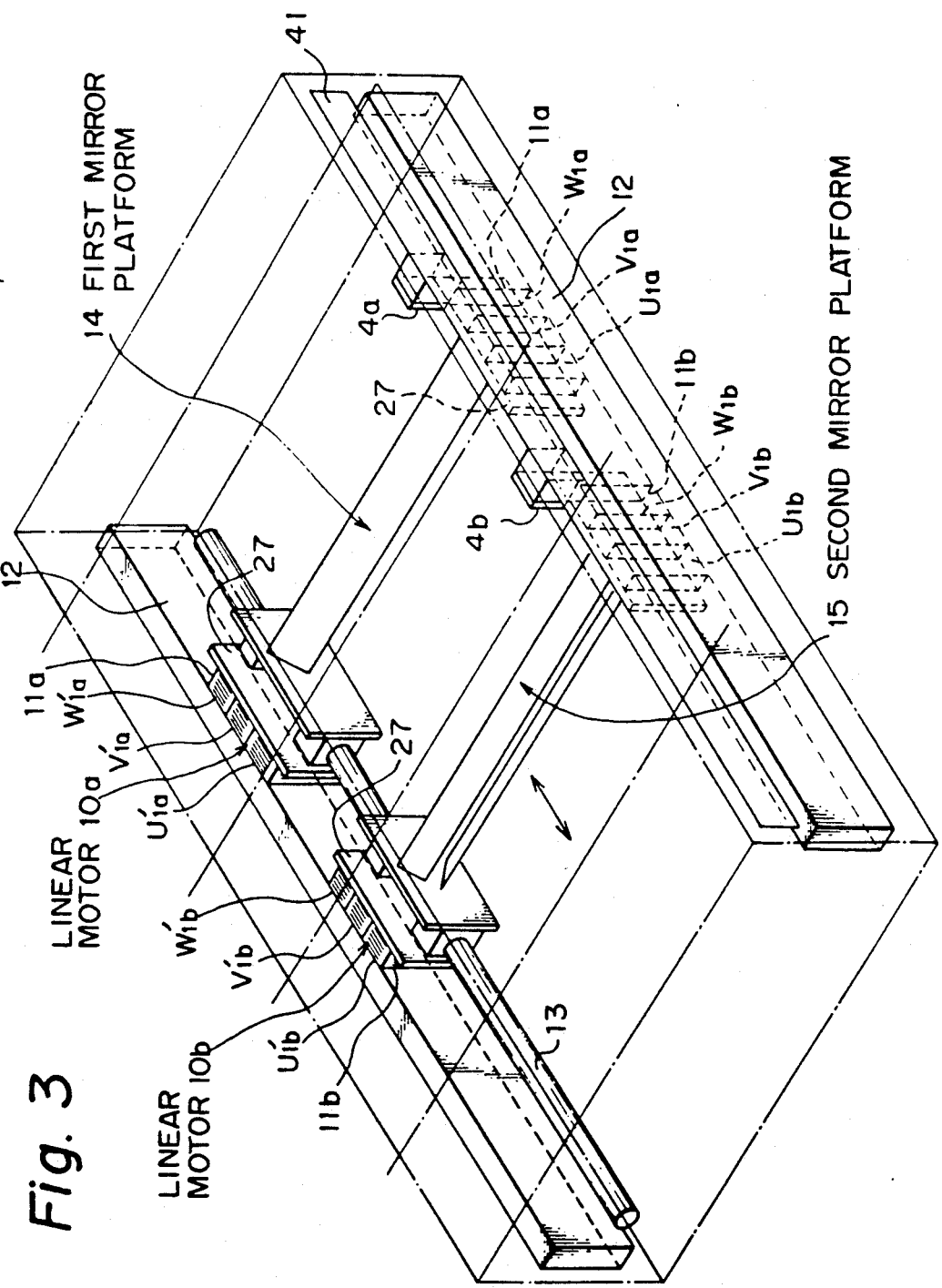
FIG. 3 is a perspective view showing an embodiment where the PLL speed control circuit is applied to an electronic duplicating machine.

With reference to FIG. 3, the description will be directed to linear motors 10a and 10b driving a first mirror platform 14 and a second mirror platform 15 in a document-scanning direction (indicated by an arrow in FIG. 3) which platforms are included in the electronic duplicating machine. In FIG. 3, small characters a and b attached to part numbers and signal numbers, as a rule, concern with the linear motors 10a and 10b, respectively.

The linear motor 10a employs a three-phase brushless D.C. linear motor, which consists of movable elements 11a located on both sides of a first mirror platform 14 and stators 12 vertically located against the movable elements 11a with a predetermined gap. The linear motor 10b employs the same type motor and consists of movable elements 11b located on both sides of the second mirror platform 15 and the stators 12 vertically located against the movable elements 11b. For smoothly travelling the first mirror platform 14, the movable elements 11a are guided along a guide shaft 13. For the second mirror platform 14, the movable elements 11b are guided along the guide shaft 13 as well. Further, the linear motor 10a provides a linear encoder 4a for detecting a stroke position of the first mirror platform 14 and the linear motor 10b provides a linear encoder 4b for detecting a stroke position of the second mirror platform 15. (41 denotes a fixed-element scale attached near the fixed element 12).

Figure 4:
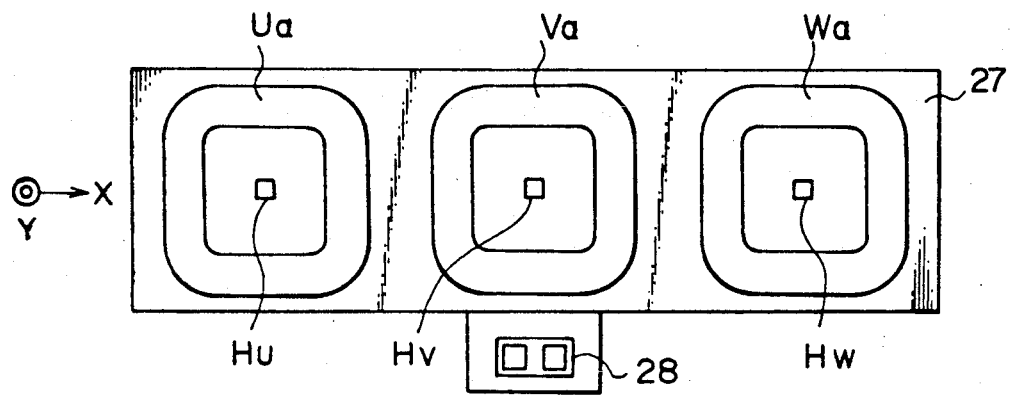
FIG. 4 is a front face view showing a core-less coil contained in a linear motor used for the electronic duplicating machine.

Then, with reference to FIGS. 4 and 5, the three-phase brushless linear motors will be described in detail.

The movable element 11a contains core-less coils $U_{1a}$, $V_{1a}$, $W_{1a}$, which match to each phase in the three-phase brushless linear motor. The core-less coils $U_{1a}$, $V_{1a}$, $W_{1a}$ have hole elements Hu, Hv, Hw respectively disposed in the air-core central portions of the coils as shown in FIG. 4. The hole elements Hu, Hv, Hw are magnetic-field detecting elements for detecting the excitation change-over in the three-phase brushless linear motor. Reference numeral 28 denotes a reflection type detector which is provided on the bottom portion of a yoke plate 27. The other core-less coils have the same construction.

The core-less coils $U_{1a}$, $V_{1a}$, $W_{1a}$ and the core-less core $U_{1a}'$, $V_{1a}'$, $W_{1a}'$ and the yoke plates 27 constitute a rotor of the first linear motor 10a. The core-less coils $U_{1b}$, $V_{1b}$, $W_{1b}$ and the core-less cores $U_{1b}'$, $V_{1b}'$, $W_{1b}'$ and the yoke plates 27 constitute a rotor of the second linear motor 10b.

Figure 5:
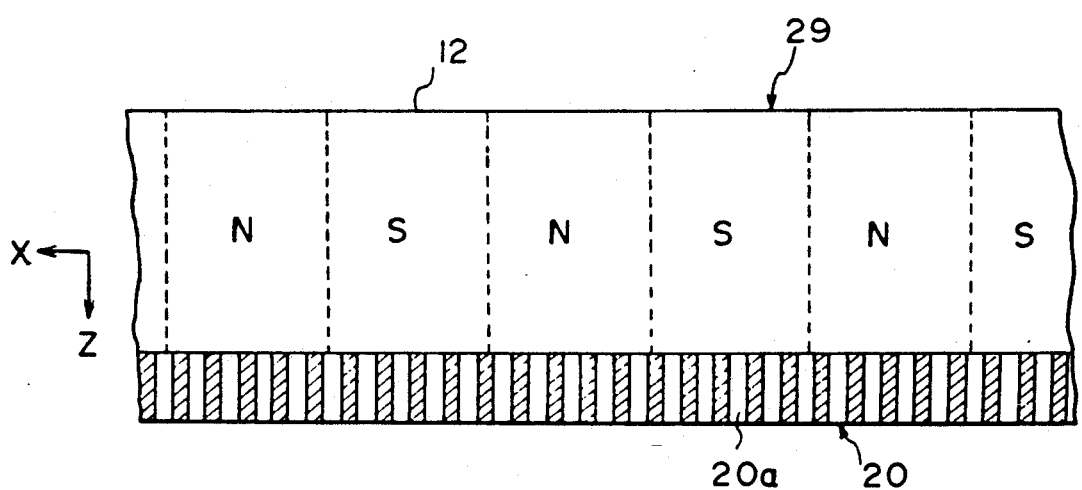
FIG. 5 is a partial block view showing a permanent magnet contained in the linear motor.

The stator 12, as shown in FIG. 5, contains a permanent magnet 29 and a yoke 20. The permanent magnet 29 is so arranged as to confront the respective core-less coils $U_a$, $V_a$, $W_a$ of the first linear motor 10a or the respective coreless coils $U_b$, $V_b$, $W_b$ of the second linear motor 10b, with a slight interval being provided with respect to the core-less coils. As shown, the permanent magnet 29 is alternately magnetized, with the N polarity and the S polarity in the face opposite to the respective core-less coils $U_a$, $V_a$, $W_a$ or $U_b$, $V_b$, $W_b$. The magnetized pitch is arranged to 3/5 times as big as the pitch among the respective coil-less coils $U_a$, $V_a$, $W_a$ or $U_b$, $V_b$, $W_b$ as shown in FIG. 4. Also, a linear scale 20a with black and white patterns being repeatedly drawn thereon is formed on the side face of the yoke 20 located in the lower portion (in a Z-direction) of the magnetized face of the permanent magnet 29 The linear scale 20a is adapted to detect the position and speed of the first mirror platform 14 and the second mirror platform 15 by the detector 28. And, the linear scale 20a is used in common by the detectors 28, provided in the first and the second mirror platforms 14 and 15.

Figure 6:
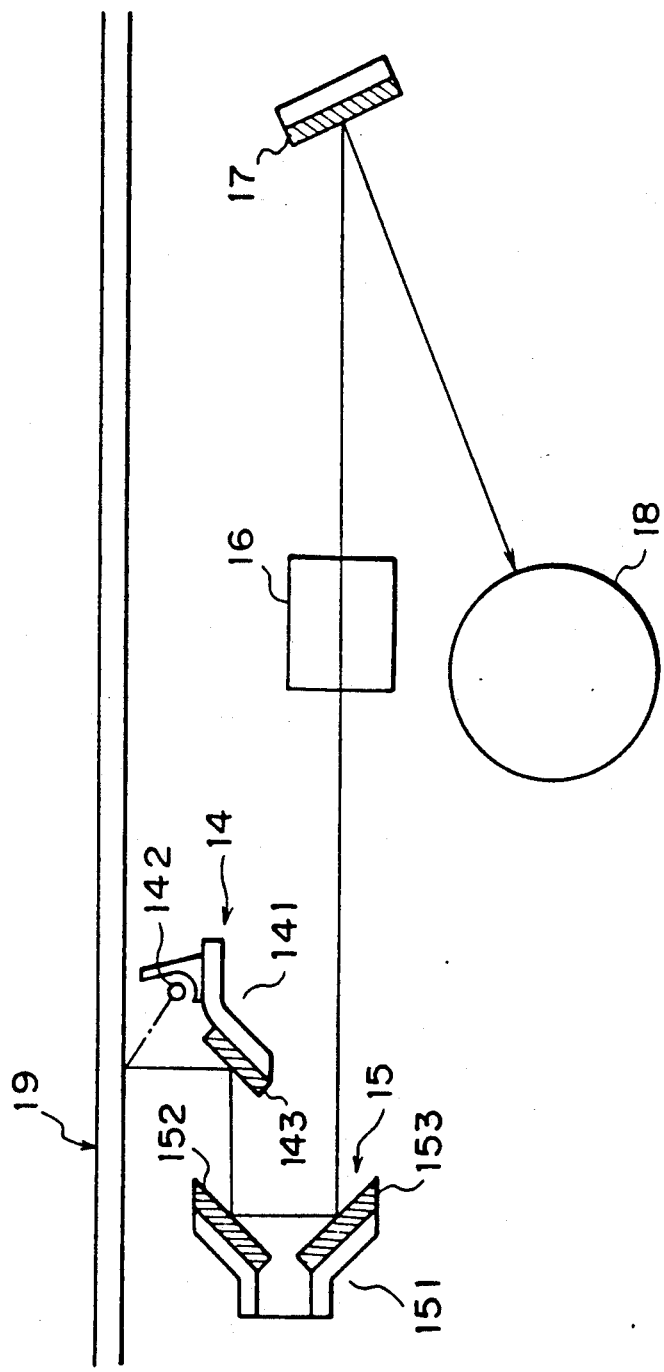
FIG. 6 is a side view showing the relation between a first mirror platform and a second mirror platform.

Next, with reference to FIG. 6, the constructions of the first and the second mirror platforms 14, 15 will be schematically described.

The first mirror platform 14 includes a halogen lamp 142 and a reflecting mirror 143 mounted on a platform body 141, while the second mirror platform 15 includes reflecting mirrors 152, 153 mounted on a platform body 151. Further, a zoom lens 16 and a reflecting mirror 17 are located at a position where the first mirror platform 14 is disallowed to come into contact with the second mirror platform 15. In operation, at first, the halogen lamp 142 radiates light to a document surface 19. Then, the light reflected from the document surface 19 is passed sequentially through the reflecting mirrors 141, 152, 153, the zoom lens 15, and the reflecting mirror 17 and then radiated to a photosensitive drum 18. The first mirror platform 14 stably travels at a speed twice as fast as the second mirror platform 15 so that an optical path between the document surface 19 and the photosensitive drum 18 is kept constant at any scanning position.

FIG. 7 indicates each speed pattern of the first mirror platform 14 (the speed of the linear motor 10a) and the second mirror platform 15 (the speed of the liner motor 10b). As is understood from the pattern, the first mirror platforms 14, 15 change their speed state in cyclic fashion from an initial waiting state $\alpha$, an accelerating state $\beta$, a constant speed state $\gamma$, a accelerating state in return $\epsilon$, and finally to the initial waiting state.

Next, with reference to FIG. 8, a description will be directed to a circuit for controlling the speed of the linear motor 10a or 10b (referred to as a linear motor control circuit).

Figure 8A:
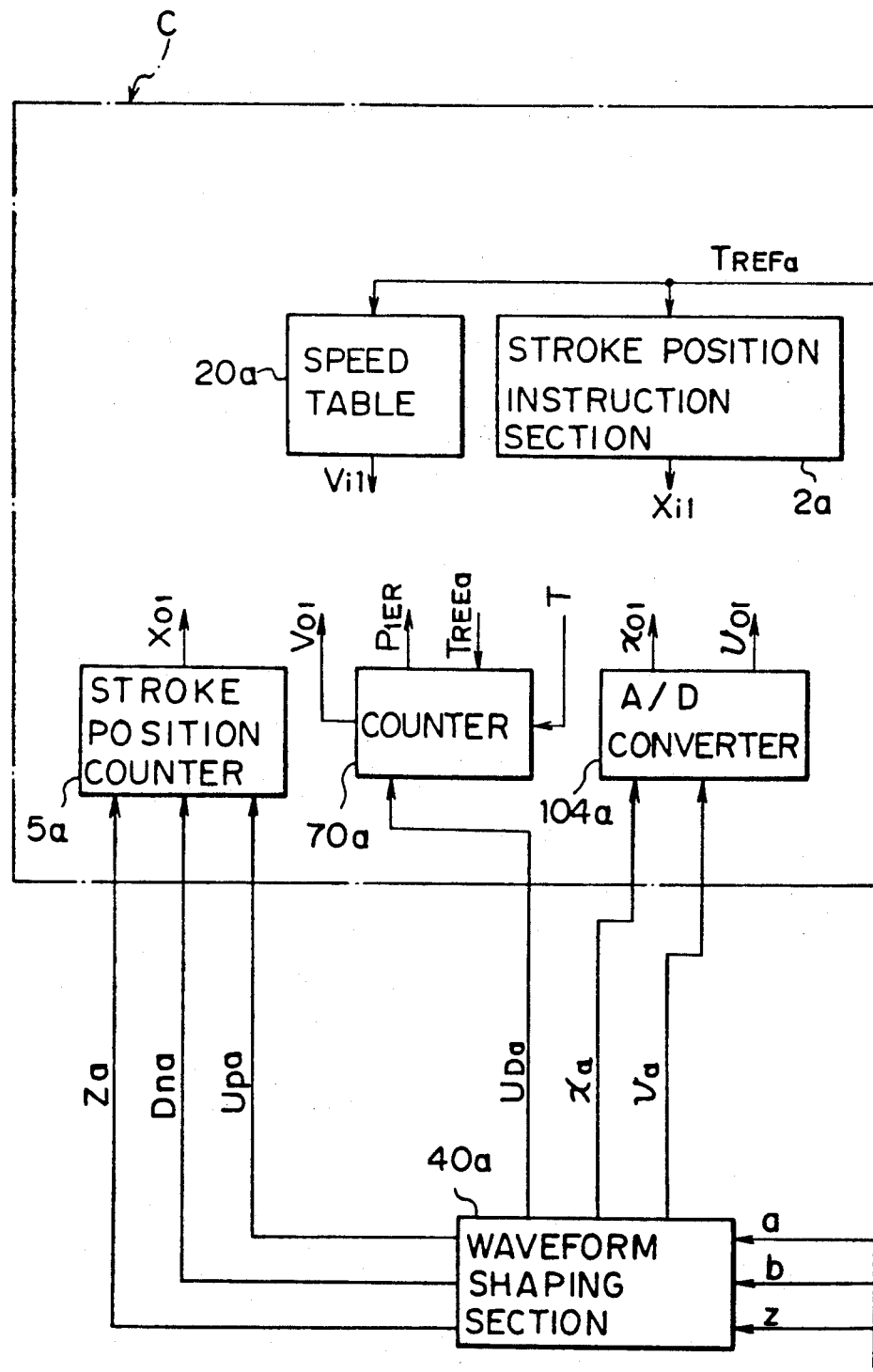
FIG. 8 which is composed of FIGS. 8A to 8C is a circuit diagram showing an electronic duplicating machine.
Figure 8B:
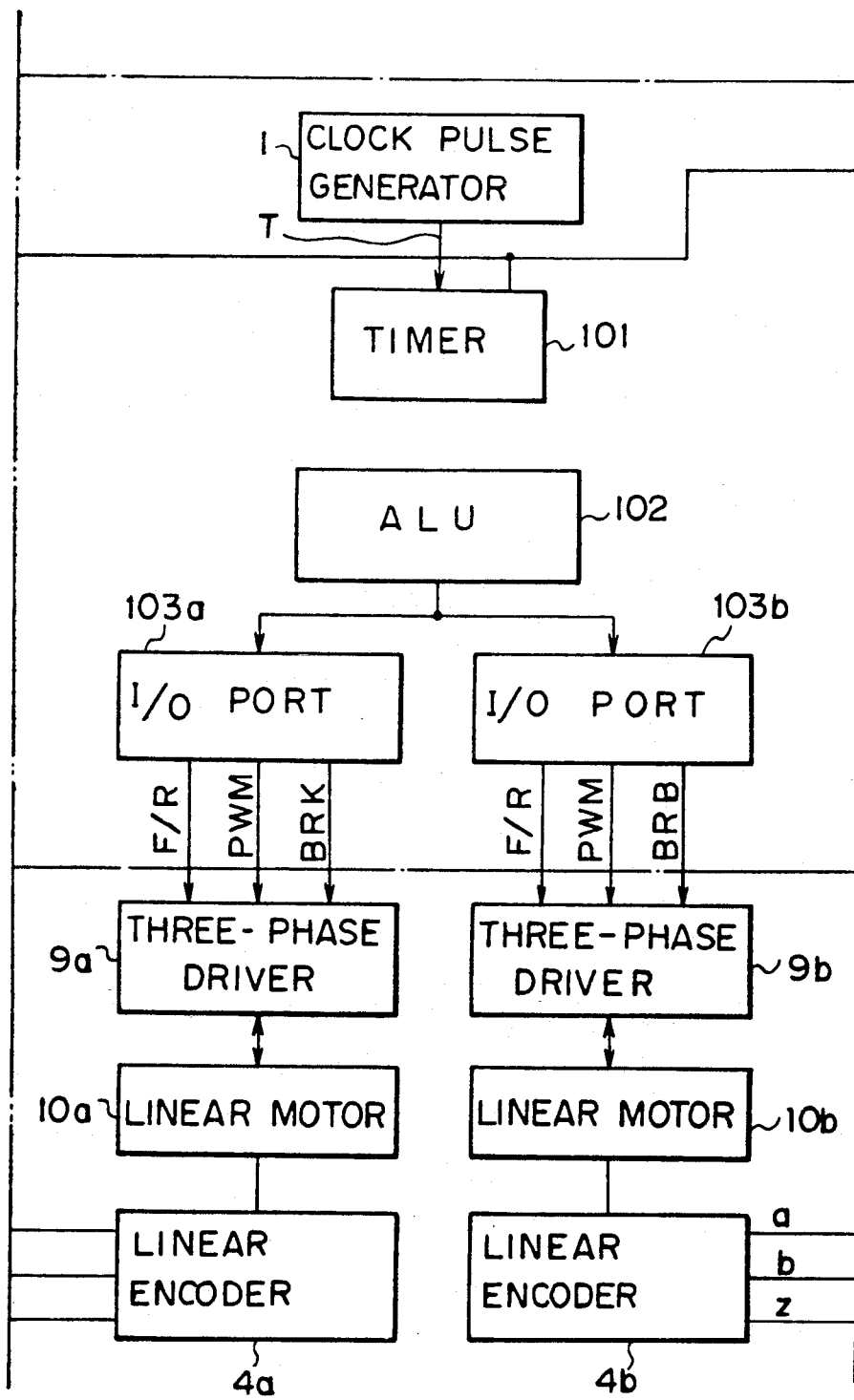
Figure 8C:
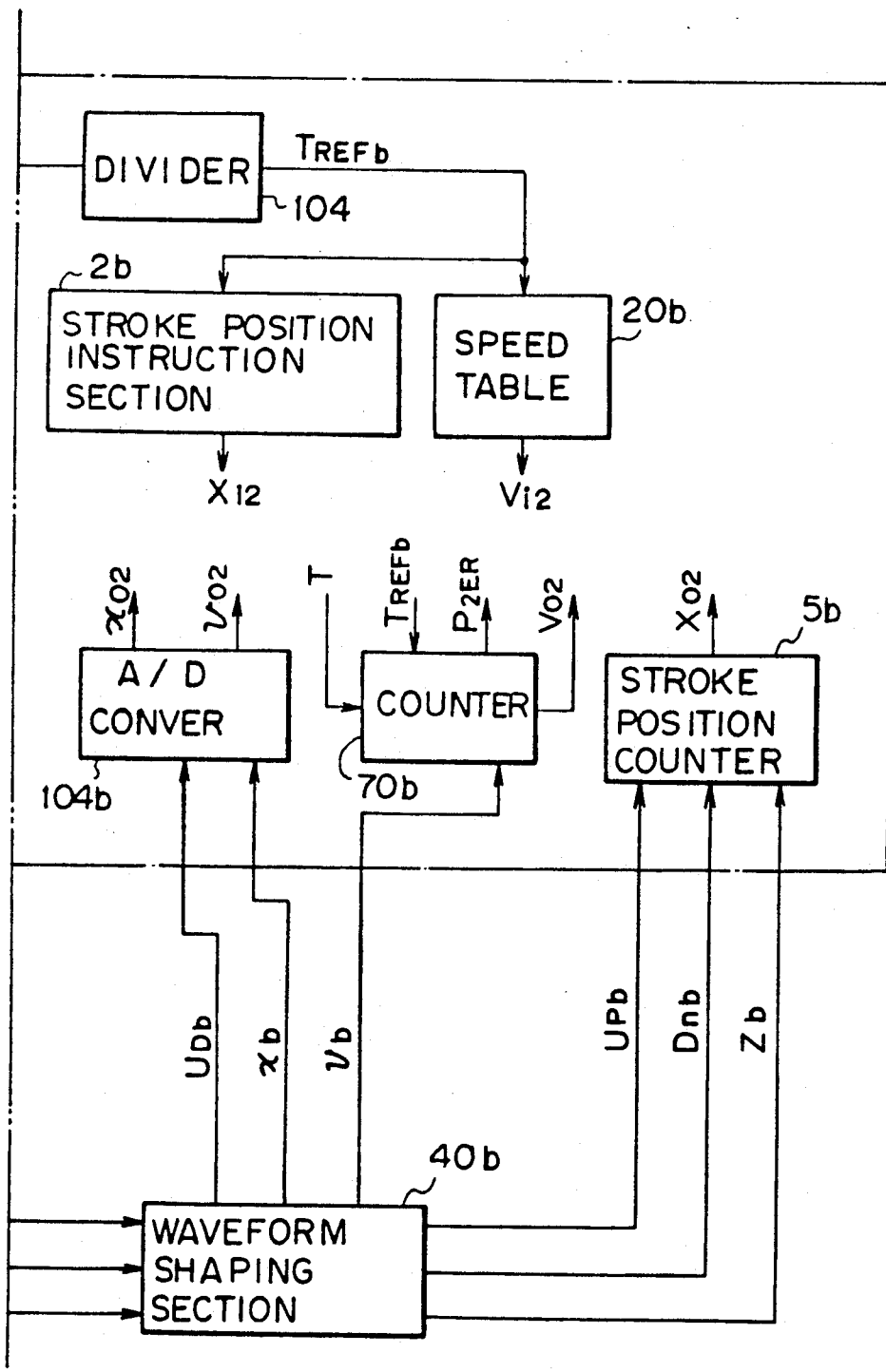

The linear motor control circuit shown in FIGS. 8A to 8C is a circuit mainly consisting of a one-chip microcomputer C known as a software servo system. It is pre-programmed in a manner to consistently control the speed of each of the linear motors 10a, 10b from the waiting $\alpha$, an accelerating state $\beta$, a constant speed state $\gamma$, and an in-return accelerating state $\epsilon$. In the constant speed state $\gamma$, it can be operative as a PLL speed control circuit according to the invention.

At first, a peripheral circuit of the one-chip microcomputer C will be discussed. The one-chip microcomputer C incorporates an I/O ports 103a, 103b therein, which are respectively connected to the linear motors 10a, 10b through three-phase drivers 9a, 9b (matching to the adjusting sections). The I/O ports 103a, 103b output an PWM signal, an F/R signal, and a BRK signal, which are respectively used for adjusting a magnitude of thrust generated in the linear motor 10a or 10b, switching of driving direction, and a magnitude of damping force.

The linear encoder 4a or 4b for detecting a relative speed of the linear motor 10a or 10b has a resolution of 400 $\mu$m and outputs an a-phase and a b-phase signals each consisting of an approximately sin wave shown in FIGS. 9a and 9b) and a Z signal assumed as an origin. These signals are all supplied to a waveform shaping section 40b.

In opposition to the waveform shaping section 40b, a waveform shaping section 40a is provided as shown in FIGS. 9a and 9b. The waveform shaping section 40a performs the operations of re-shaping the a-phase signal and the b-phase signal into a $U_{pa}$ signal and a $D_{na}$ signal, adding the $U_{pa}$ signal into the $D_{na}$ signal, and generating a $U_{pa}$ signal (matching to an encoder pulse $X_{FBA}$). The other operations the waveform shaping section 40a performs is to produce an analog position signal $x_a$ consisting of a pseudo-sawtooth wave from the a-phase and b-phase signals as well as to differentiate the a-phase and the b-phase signals and then to synthesize these signals into an analog speed signal $v_a$. The analog position signal $x_a$, the analog speed signal va and the $U_{pa}$ signal are all supplied to a stroke position counter 5a, an analog-to-digital converter (referred to as an A/D converter) 104a, and a counter 70a.

The description of the foregoing waveform shaping section 40b will be left out since it has the same construction as the waveform shaping section 40a. In addition, as a rule, the signal names and data names with capital letters indicate digital data quantized at a pitch of 400 μm (resolution). Those with small letters indicate analog data or digital data quantized at a smaller pitch than 400 μm.

Then, a description will be directed to the stroke position counter 5a, the counter 70a, and the A/D converter 104a incorporated in the one-chip microcomputer C. The stroke position counter 5a serves to count up or down in response to the $U_{pa}$ signal or the $D_{na}$ signal and clear up in response to the $Z_a$ signal (meaning the reshaped Z signal sent from the linear encoder 4a). The stroke position counter 5a offers digital position data $X_{01}$ indicating a stroke position of the linear motor 10a (first mirror platform 14). And, the counter 70a serves to trigger the $U_{pa}$ signal at its leading edge for counting a clock pulse T (6 MHz) supplied from the clock pulse generator 1. The counting data offered by the counter 70a indicates a pulse interval of the $U_{pa}$ signal, which is the digital speed data $V_{01}$ assumed as the speed of the linear motor 10a.

Data TCK denotes the time taken in travelling an object, which corresponds to one pitch defined in the linear encoder 4a or 4b. The data TCK is represented by the number of clock pulse T. It is thus understood that the digital desired speed data $V_{i1}$ equals to the data TCK. The data is also effective as a timer-setting data used for generating a reference pulse $T_{REFa}$.

Figure 1A:
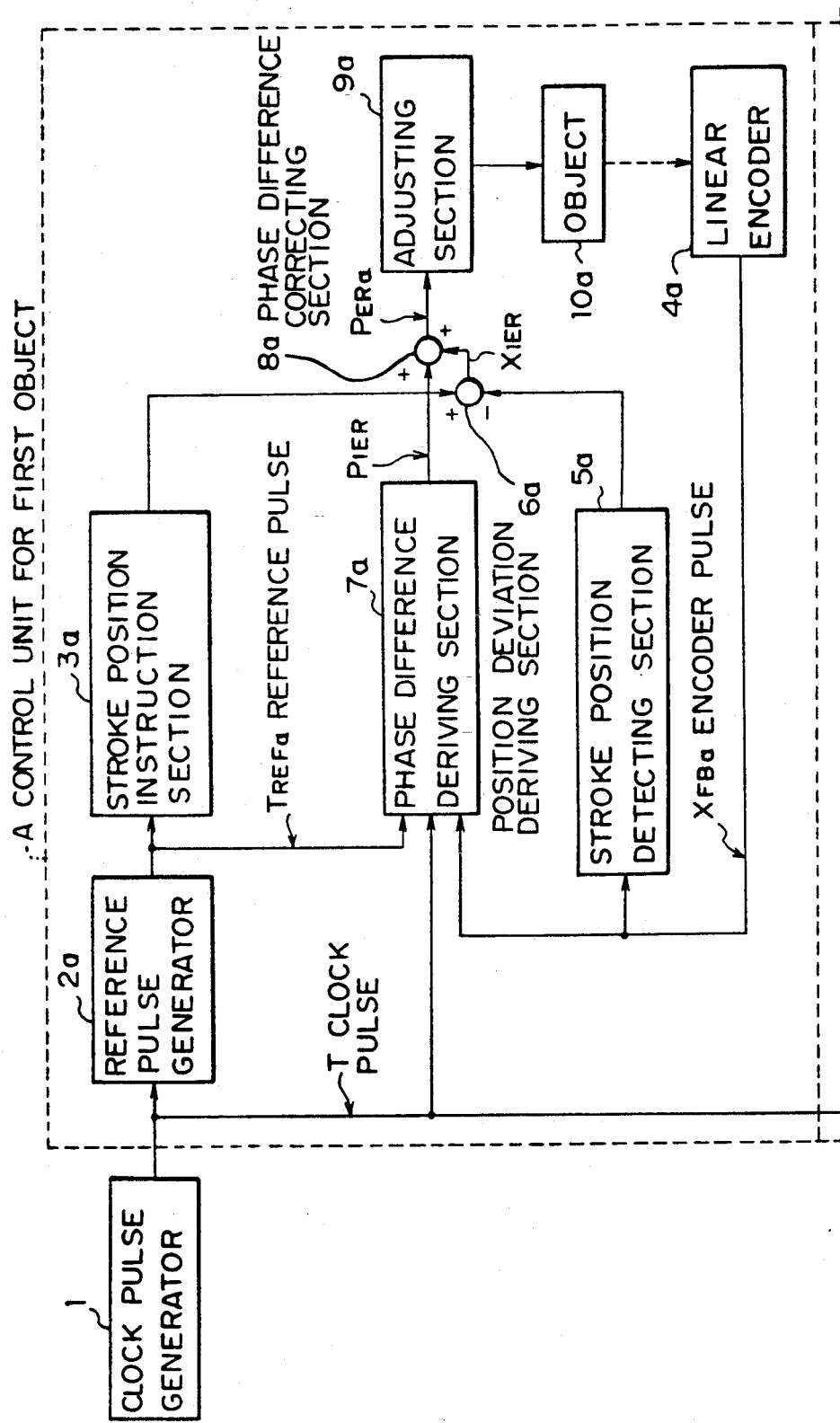
FIG. 1 which is composed of FIGS. 1A and 1B is a block diagram showing a PLL speed control circuit according to the present invention.
Figure 1B:
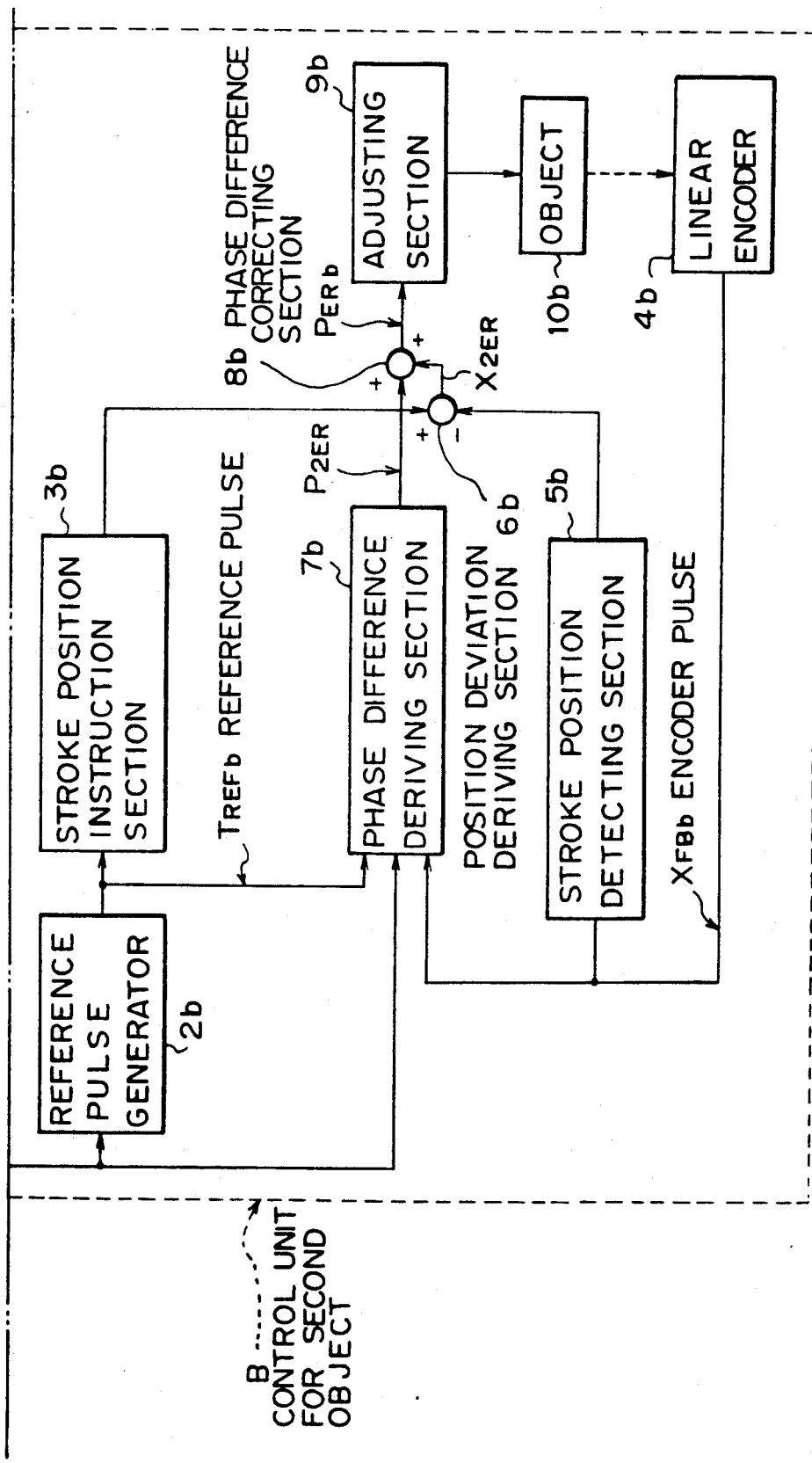

The counter 70a serves to count a phase difference between the $U_{pa}$ signal and the reference pulse $T_{REFa}$ sent from a timer section 101 (described later) and output it as a count number of the clock pulse T (phase difference data $P_{1ER}$). This function offered by the counter 70a corresponds to the phase difference deriving section shown in FIG. 1.

The A/D converter 104a serves to sequentially analog-to-digital convert the analog position signal $x_a$ to a digital signal (the data to be converted is the analog position data $x_{01}$) and the analog speed signal $v_a$ into a digital signal (the data to be converted is the analog speed data $v_{01}$).

In addition, no description is directed to the stroke position counter 5b, the counter 70b, and the A/D converter 104b incorporated in the one-chip microcomputer C, because they have the same arrangements and functions as the foregoing components. So are the data and the signals.

Next, a description will be directed to a speed table 20a and a stroke position instruction section 2a shown in FIG. 8. It concerns with the software function. The speed table 20a is a ROM table which pre-saves a speed pattern of the linear motor 10a shown in FIG. 7. The data saved in the speed table 20a is allowed to be properly read out in response to the reference pulse $T_{REFa}$. The read data is treated as the digital desired speed data $V_{i1}$ for specifying a digital desired speed of the linear motor 10a and the timer-setting data used for generating the reference pulse $T_{REFa}$ on which the digital desired speed is defined. The relevant function of the speed table 20a corresponds to the reference pulse generator shown in FIG. 1.

This digital desired speed data $V_{i1}$ is converted into digital position instruction data $X_{i1}$ in the stroke position instruction section 2a mainly consisting of a register counter. The analog position instruction data $x_{i1}$ and the digital position instruction data $X_{i1}$ respectively indicate an instructed value of the stroke position of the linear motor 10a.

In addition, no description is directed to a speed table 20b and a stroke position instruction section 2b, because they have the same arrangements and functions as the foregoing ones. In the different respect, however, the speed table 20b and the stroke instruction section 2b receive the reference pulse $T_{REFb}$ which is half as long as that for the sections 20a and 2a from a divider 104. This is because the second mirror platform 15 is allowed to travel at a speed half as fast as the first mirror platform 14. The one-chip microcomputer C incorporates a timer 101 and an arithmetic logic section 102 in it.

Then, the operation of the one-chip microcomputer C is described at each stage of the waiting state α, an accelerating state β, a constant speed state γ, and an in-return accelerating state ε.

(1) Waiting State α

Figure 10:
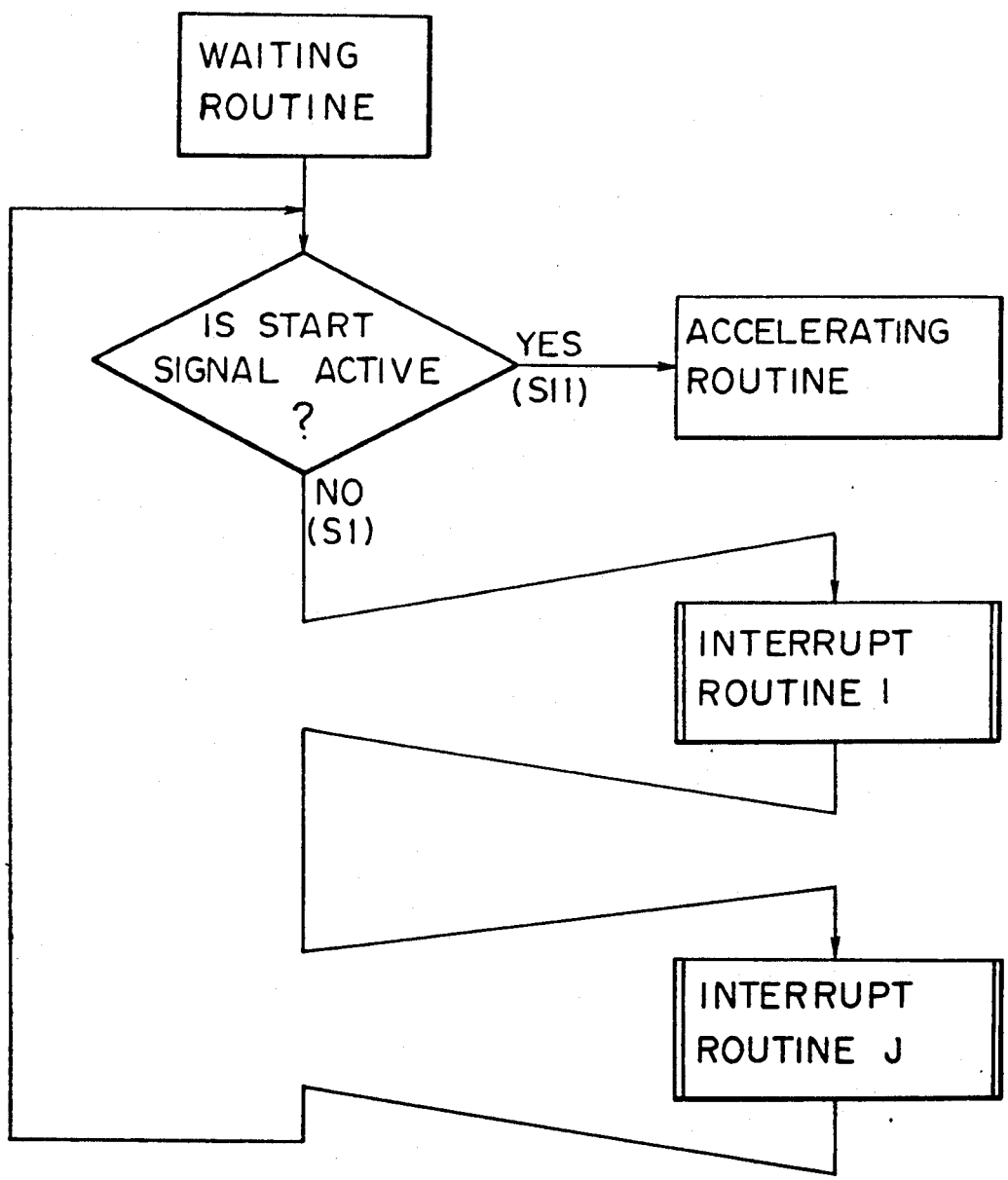
FIG. 10 is a flowchart showing a waiting state routine.

When the linear motors 10a, 10b enters into the waiting state, the waiting routine as shown in FIG. 10 is executed. At first, when a switch (not shown) is pressed, the A/D converters 104a and 104b issue A/D interrupt signals for properly executing an interrupt routine I and an interrupt routine J until the start signal enabled by the switch becomes active.

Figure 11:
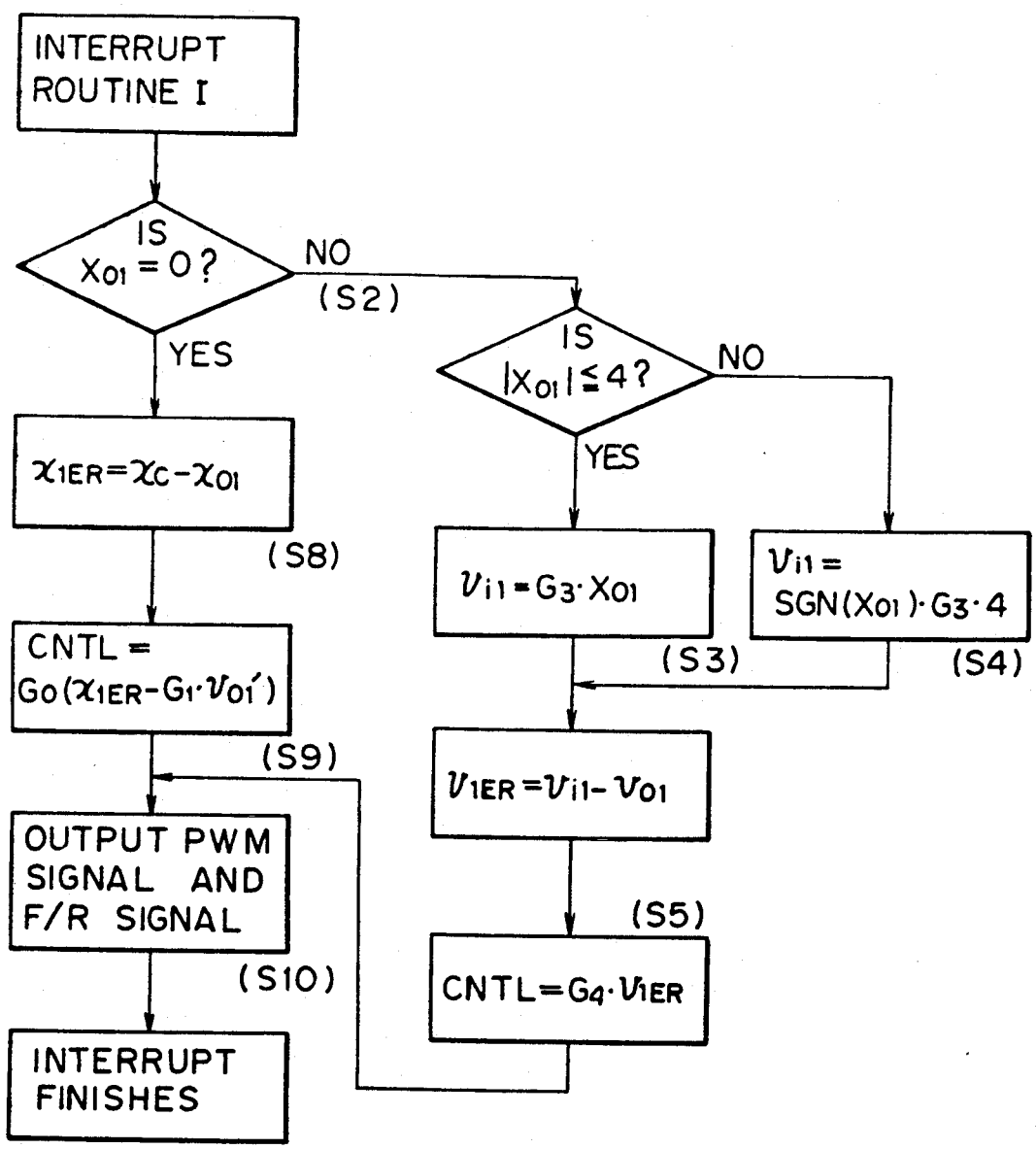
FIG. 11 is a flowchart showing an interrupt routine 1 included in the waiting state routine.
Figure 12:
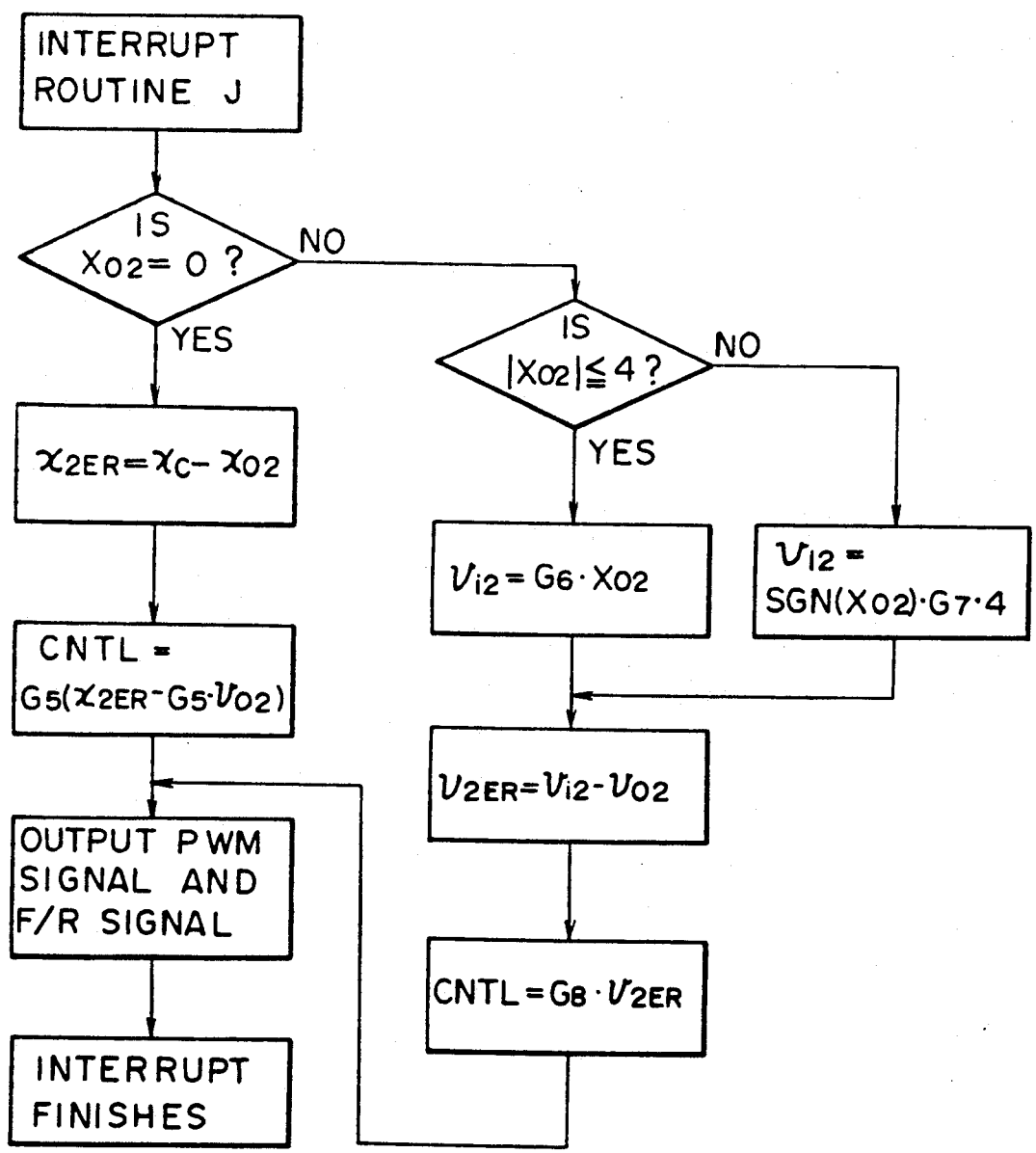
FIG. 12 is a flowchart showing an interrupt routine J included in the waiting state routine.

That is, as shown in FIGS. 11 and 12, if the A/D converter 104a issues an interrupt signal when the start signal is still inactive (S1), the process goes to the interrupt routine I. At this routine, it is determined if the digital position data $X_{01}$ is zero. If the digital position data $X_{01}$ is one or more (S2), it is further determined if it is four or more. If it is less than four, the analog desired speed data $v_{1i}$ is derived on this data (S3). If it is four or more, the analog desired speed data $v_{i1}$ is derived within a given range (S4). Then, the analog speed data $v_{01}$ is subtracted from the analog desired speed data $v_{i1}$ to derive the analog speed deviation data $v_{1ER}$ (S5). Next, CNTL data is derived on the analog speed deviation data $v_{1ER}$.

If, on the other hand, the digital position data $X_{01}$ is zero, the analog position data $x_{01}$ is subtracted from $x_c$ (matching to the analog position data $x_{01}, x_{02}$ given when the linear motors 10a, 10b stay at initial positions) for deriving the analog position deviation data $x_{1ER}$ (S8). Then, the CNTL data is derived on the analog position deviation data $x_{1ER}$ and the analog speed data $v_{01}$ (S9).

After the CNTL data is derived as a result of the foregoing process, the interrupt routine I outputs a PWM signal and an F/R signal matching to the magnitude and the sign of the CNTL data (S9) and then finally finishes.

If the A/D converter 104b issues an interrupt signal, the process goes to an interrupt routine H. This routine H, however, is not described since it is quite same as the routine I.

The waiting routine has an advantage that the origin is far more accurately positioned based on the feedback control of the analog speed than the feedback control of the digital speed utilizing the digital speed data $V_{01}$ and the digital position data $X_{01}$. This is because the digital speed has a relatively large time lag. $G_1$ to $G_8$ shown in FIGS. 11 and 12 denote any servo gain.

Figure 13:
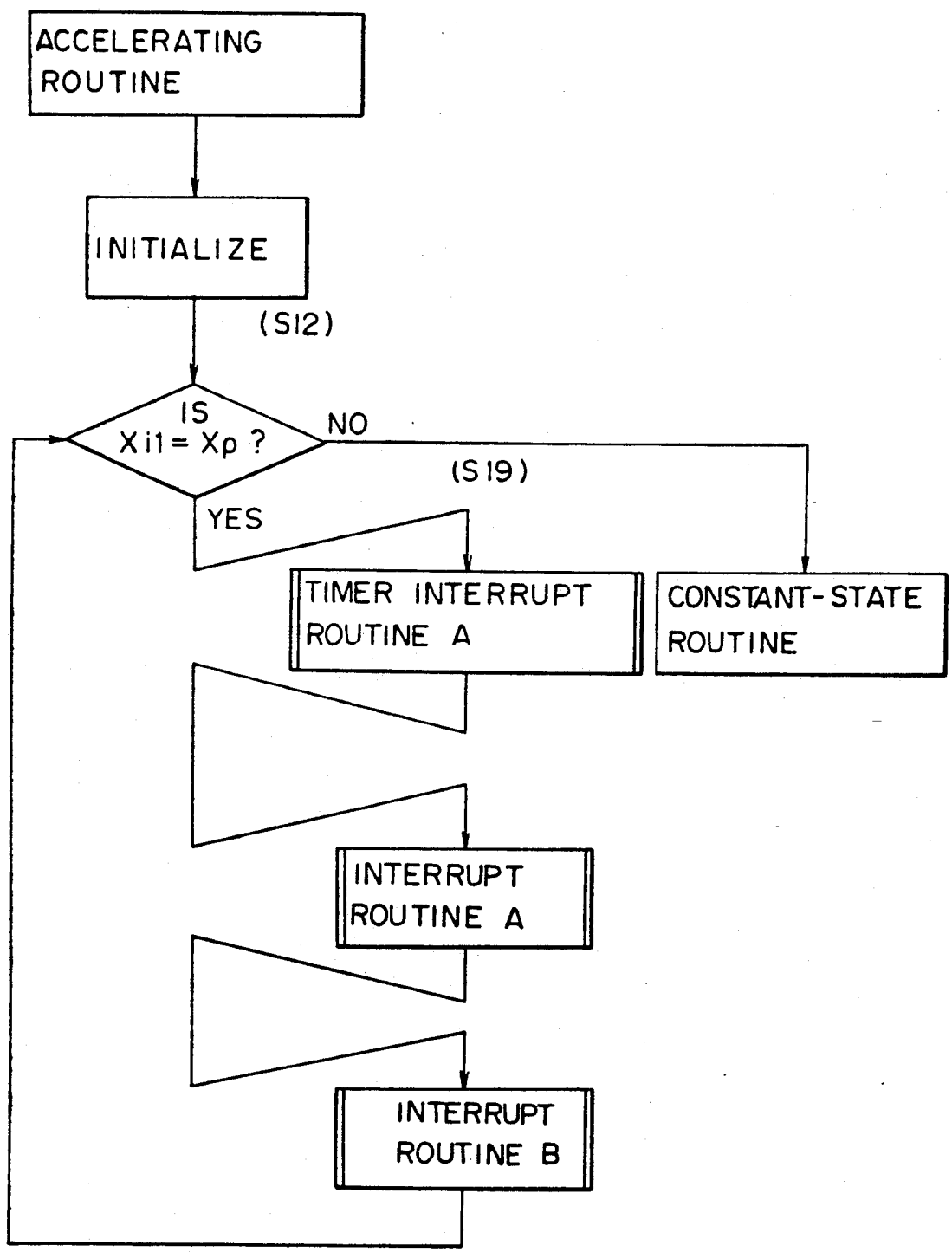
FIG. 13 is a flowchart showing an accelerating routine.

And, when the start signal becomes active while the waiting routine is executed step by step, the accelerating routine, as shown in FIG. 13, gets started (S11). In the following description, TBL1(n) and TBL2(n) respectively stand for the contents of the data read out of the linear speed tables 20a, 20b when the digital position instruction data $X_{i1}$ and $X_{i1}$ each indicate n.

(2) Accelerating State

Proceeding to the accelerating routine, as shown in FIG. 13, at an initializing step, the timer 101 is started using the value of TBL1(1) for pre-setting TBL1(2 in preparation for the next timer operation. And, the PWM signal and the F/R signal are output so as to drive the linear motors 10a, 10b in the feeding direction at the maximum thrust (S12). Then, until the digital position instruction data $X_{i1}$ matches to $X_p$ (matching to the digital position data $X_{01}$ assumed when the linear motor 10a stays at a D point shown in FIG. 7), a timer-interrupt routine A, an interrupt routine A, and an interrupt routine B are properly executed. The process will be discussed in detail.

Figure 14:
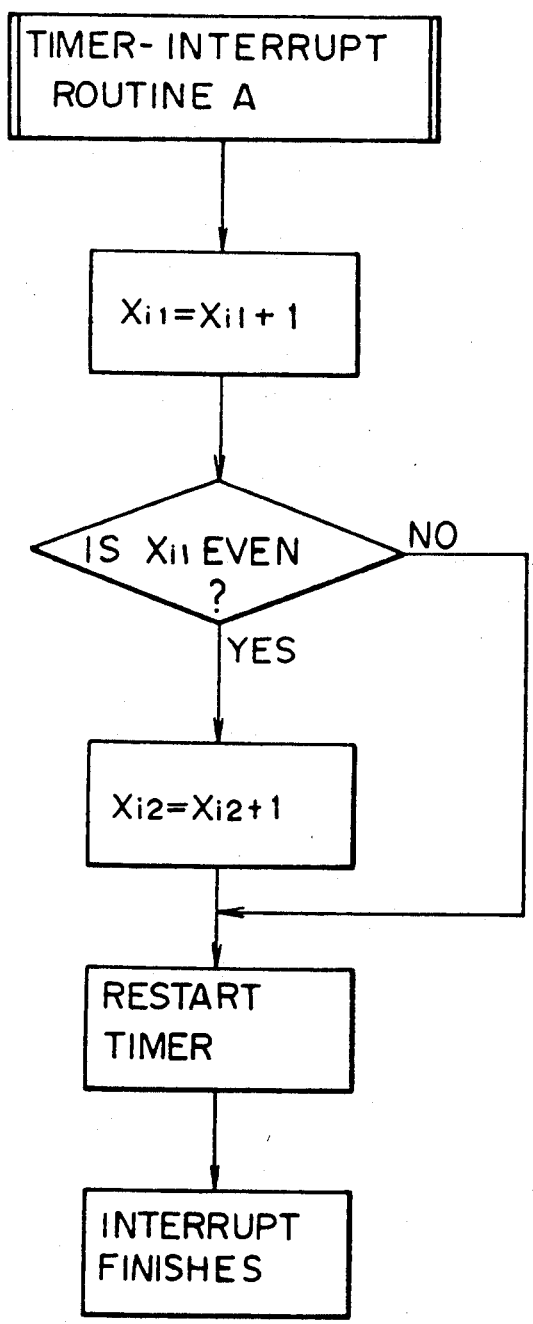
FIG. 14 is a flowchart showing a timer-interrupt routine A included in the accelerating routine.

When the timer 101 finishes counting the value of TBL1(1), as shown in FIG. 14, the process proceeds to the timer-interrupt routine A. At this timer-interrupt routine A, the digital position instruction data $X_{i1}$ is incremented by one. Then, it is determined if the digital position instruction data $X_{i1}$ is even. If it is, the digital position instruction data $X_{i2}$ is incremented by one. Then, the TBL1($X_{i1}$+1) data is read out of the speed table 20a based on the one-incremented digital position instruction data and then the timer 101 is started on the read data. Later, the process is repeated until the digital position instruction data $X_{i1}$ matches to $X_p$.

Figure 15:
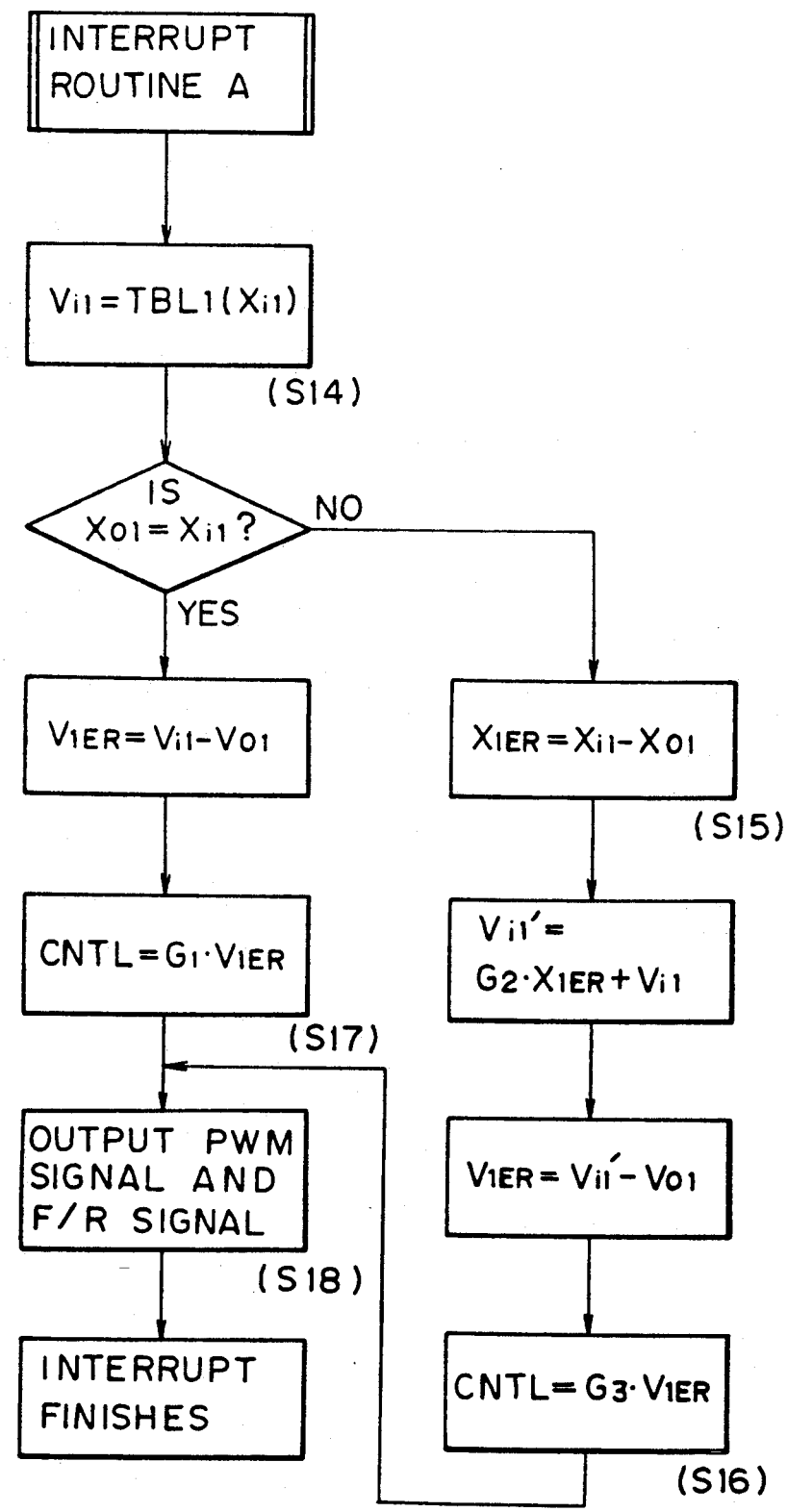
FIG. 15 is a flowchart showing an interrupt routine A included in the accelerating routine

The interrupt routine A is then discussed in detail. As shown in FIG. 15, the process updates the digital position data $X_{01}$ and proceeds to the interrupt routine A. At the routine A, the TBL1($X_{i1}$) data is read out of the speed table 20a and is assumed as the digital desired speed (S14). Then, it is determined if the digital position data $X_{01}$ matches to the digital position instruction $X_{i1}$. If not matched, the digital position data $X_{01}$ is subtracted from the digital position instruction data so as to derive the digital position deviation data $X_{1ER}$ (S15). The corrected digital speed data $V_{i1}'$ is derived using the digital position deviation data $X_{1ER}$ and the digital desired speed data $V_{i1}$. Then, the digital speed data $V_{01}$ is subtracted from the corrected digital speed data $V_{i1}'$ for deriving the digital speed deviation data $V_{1ER}$ on which the CNTL data is obtained (S17).

After the foregoing process results in deriving the CNTL data, the interrupt routine A serves to output the PWM signal and the F/R signal matching to the magnitude and the sign of the CNTL data (S18) and the finishes.

No description will be directed to an interrupt routine B (see FIG. 16) interrupted every time the digital position data $X_{02}$ is updated, because it is the same as the interrupt routine A.

Figure 16:
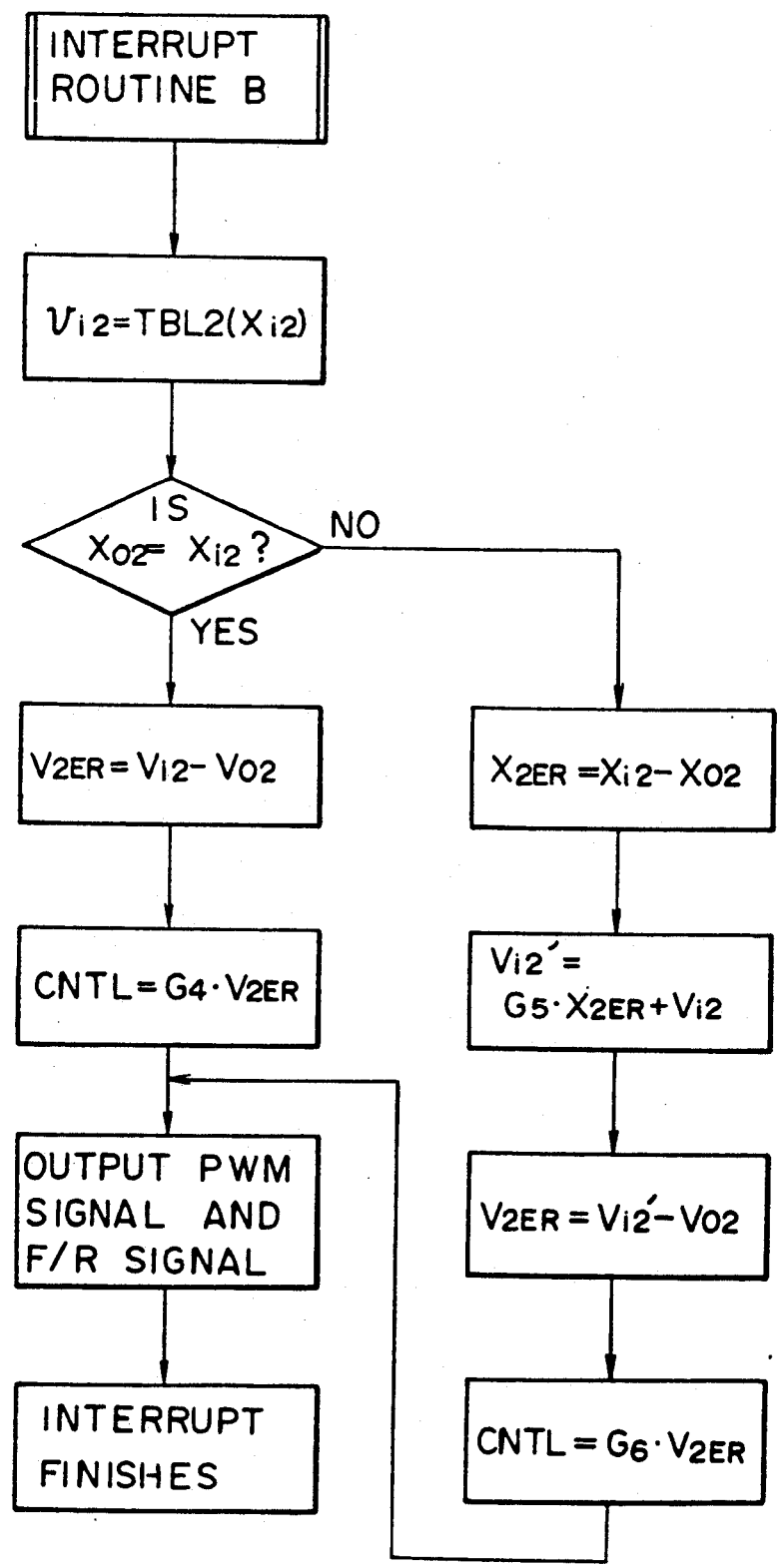
FIG. 16 is a flowchart showing an interrupt routine B included in the accelerating routine.

In the accelerating routine, when the position deviations of the linear motors 10a, 10b in the accelerating state are ±200 μm or smaller, the routine executes the normal speed feedback control. When the position deviations are more than ±200 μm, the speed is subject to the feedback control done on the speed deviation data $V_{1ER}$ and $V_{2ER}$ for converging the speed error faster, both of which data are the resulting signals of the correcting digital speed data $V_{i1}'$, $V_{i2}$. This feedback control makes it possible to drive the linear motors 10a, 10b at a high speed in a manner to allow the linear motor 10a to travel twice as fast as the linear motor 10b. In FIGS. 14 to 16, $G_1$ to $G_6$ denote any servo gain.

Figure 17:
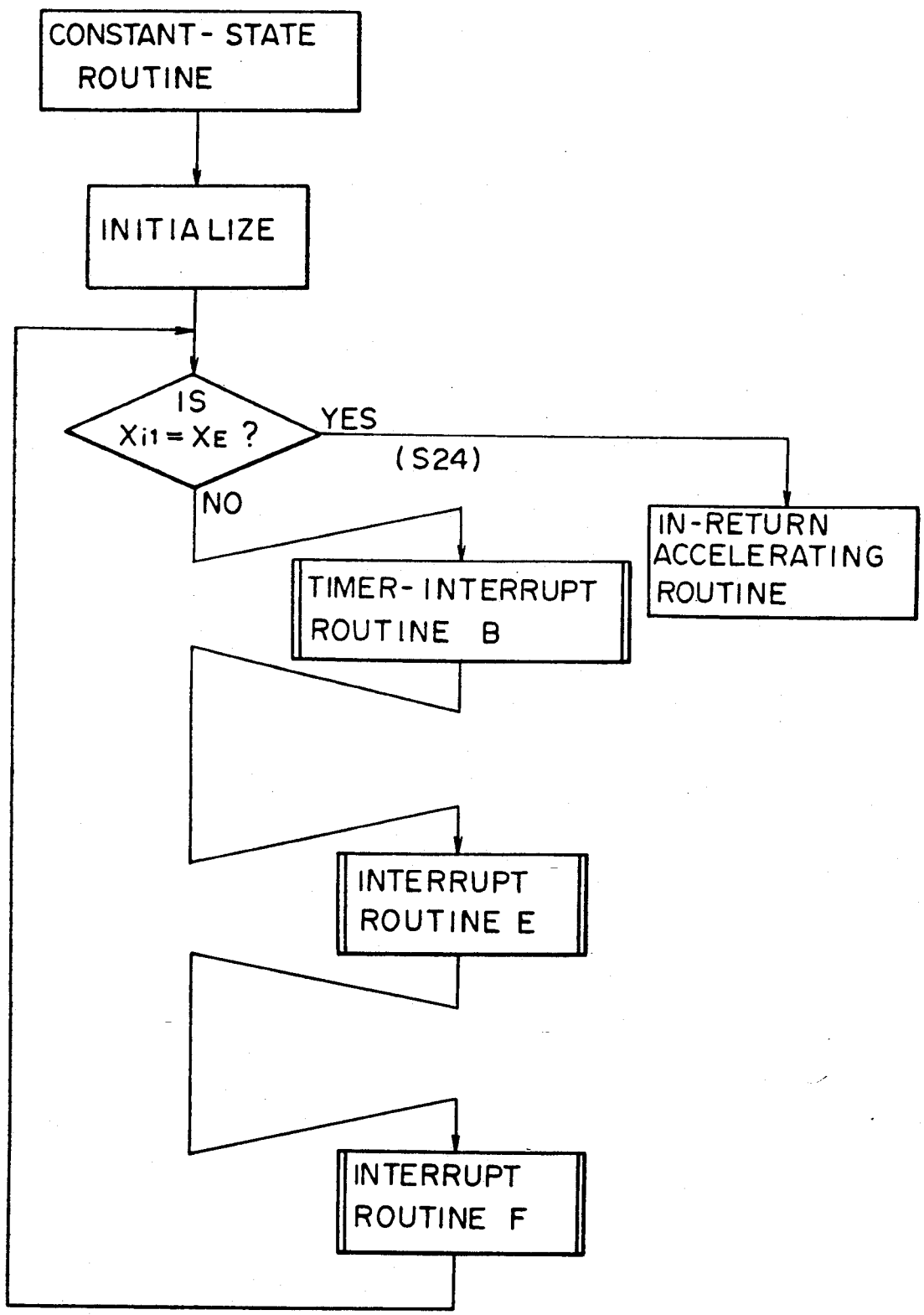
FIG. 17 is a flowchart showing a constant state routine.

When the digital position instruction data $X_{i1}$ matches to $X_p$ in the accelerating routine, the process proceeds to the constant-state routine as shown in FIG. 17 (S19).

(3) Constant Speed State γ

Proceeding to the constant-state routine as shown in FIG. 17, at an initializing step, the digital desired speed data $V_{i1}$ is read out of the speed table 20a and then the timer 101 is started based on this data. The timer 101 is served as an interval timer. Then, the process serves to iteratively execute a timer-interrupt routine F, an interrupt routine E, and an interrupt routine F unless the digital position instruction data $X_{i1}$ is equal to $X_E$. $X_E$ indicates the digital position instruction data $X_{01}$ provided when the linear motor 10a is located at the E point shown in FIG. 7.

Figure 18:
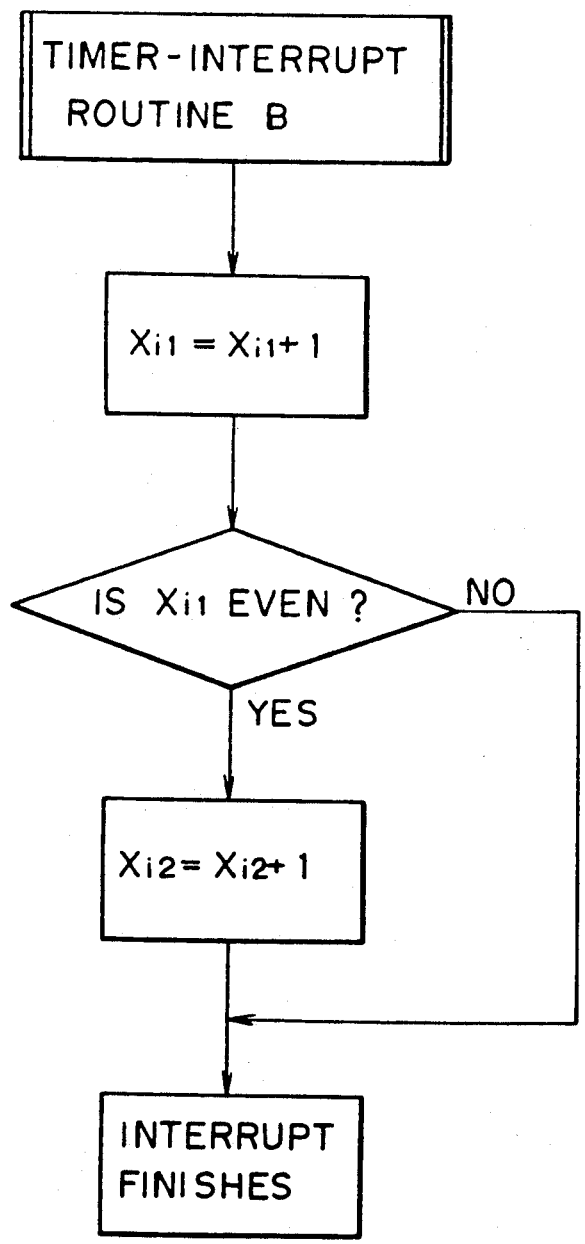
FIG. 18 is a flowchart showing a timer-interrupt routine B included in the constant state routine.

This iterative process will be discussed with reference to FIG. 18. In this process, each time the timer 101 finishes counting of the digital desired speed data $V_{i1}$, the process proceeds to the timer interrupt routine B. At this routine B, the digital position instruction data $X_{i1}$ is incremented by 1 and then it is determined if the digital position instruction data $X_{i1}$ is even. Only if it is even, the digital position instruction data $X_{i2}$ is incremented by 1. This operation is repeated subsequently unless the digital position instruction data $X_{i1}$ is equal to $X_E$.

Then, the interrupt routine E will be discussed with reference to FIG. 19. The updated digital position data $X_{01}$ is sent to the interrupt routine E. At this routine E, it is determined if the digital position data $X_{01}$ is equal to the digital position instruction data $X_{i1}$. If not, the digital position data $X_{01}$ is subtracted from the digital position instruction data $X_{i1}$, resulting in deriving the digital position deviation data $X_{1ER}$ (S20). Then, the desired speed data $V_{i1}$ is corrected using the digital position deviation data $X_{1ER}$. At the next step, the digital speed data $V_{01}$ is subtracted from the corrected digital desired speed data $V_{i1}'$ for deriving the digital speed deviation data $V_{1ER}$, on which the CNTL data is derived (S21).

If, on the other hand, the digital position data $X_{01}$ is equal to the digital position instruction data $X_{i1}$, $-TCK/2$ is added to the phase difference data $P_{1ER}$ for offsetting the data $P_{1ER}$, thereby deriving the corrected phase difference data $P_{ERa}$ (S22). The function of deriving the data $P_{ERa}$ is carried out in the phase difference correcting section shown in FIG. 1. Then, the digital desired speed data $V_{i1}$ is corrected on this corrected phase difference data $P_{ERa}$ for deriving the corrected digital desired speed data $V_{i1}'$ and the digital speed data $V_{01}$ is subtracted from the corrected digital desired speed data $V_{i1}'$ for deriving the digital speed deviation data $V_{1ER}$. Using the data $V_{1ER}$, the CNTL data is derived (S23).

The CNTL data is supplied to the next step at which the routine E forces the PWM signal and the F/R signal matching to the magnitude and the sign of the CNTL data to be output. Finally, this interrupt routine E is finished.

Figure 19:
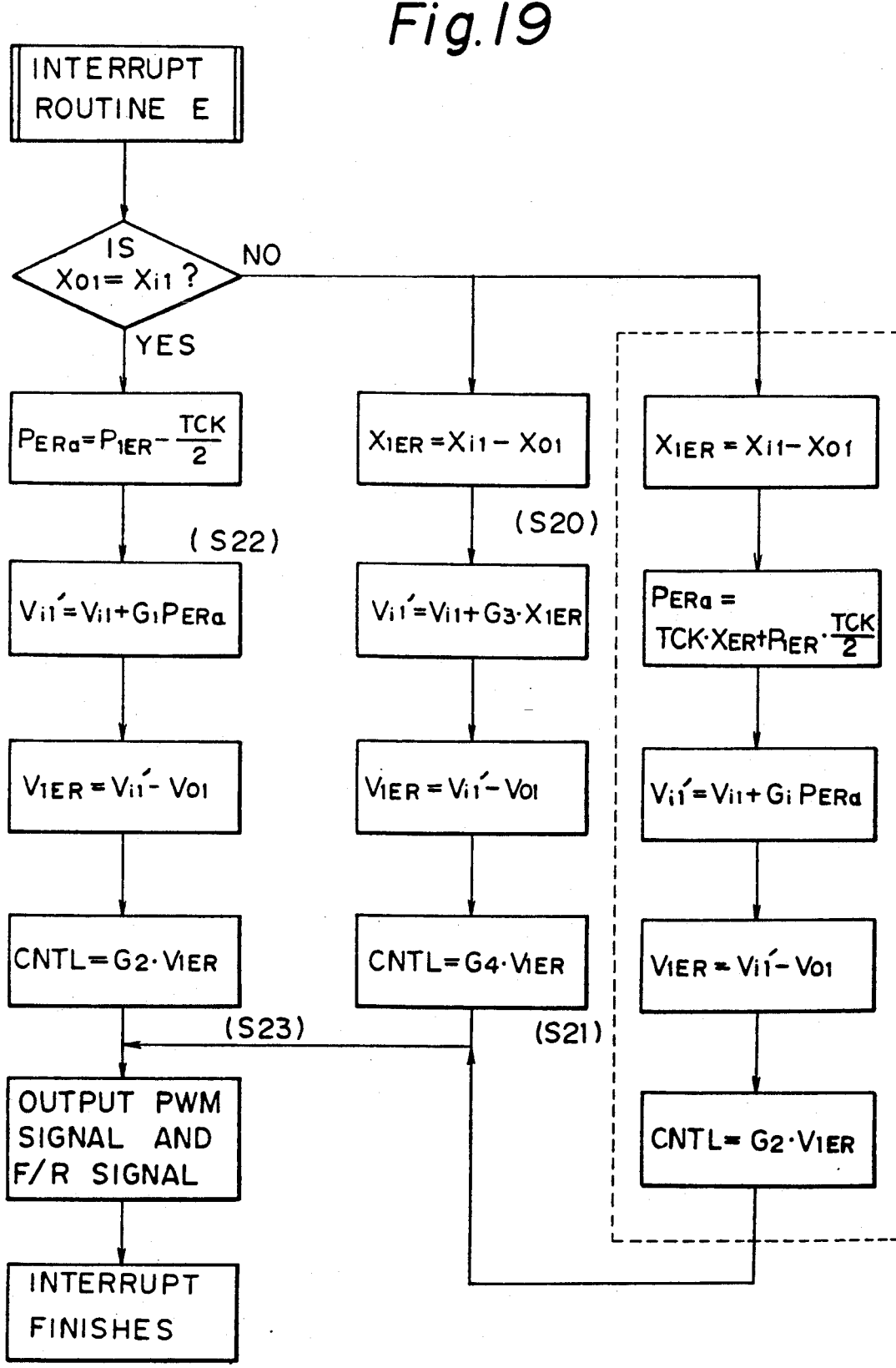
FIG. 19 is a flowchart showing an interrupt routine E included in the constant state routine.
Figure 20:
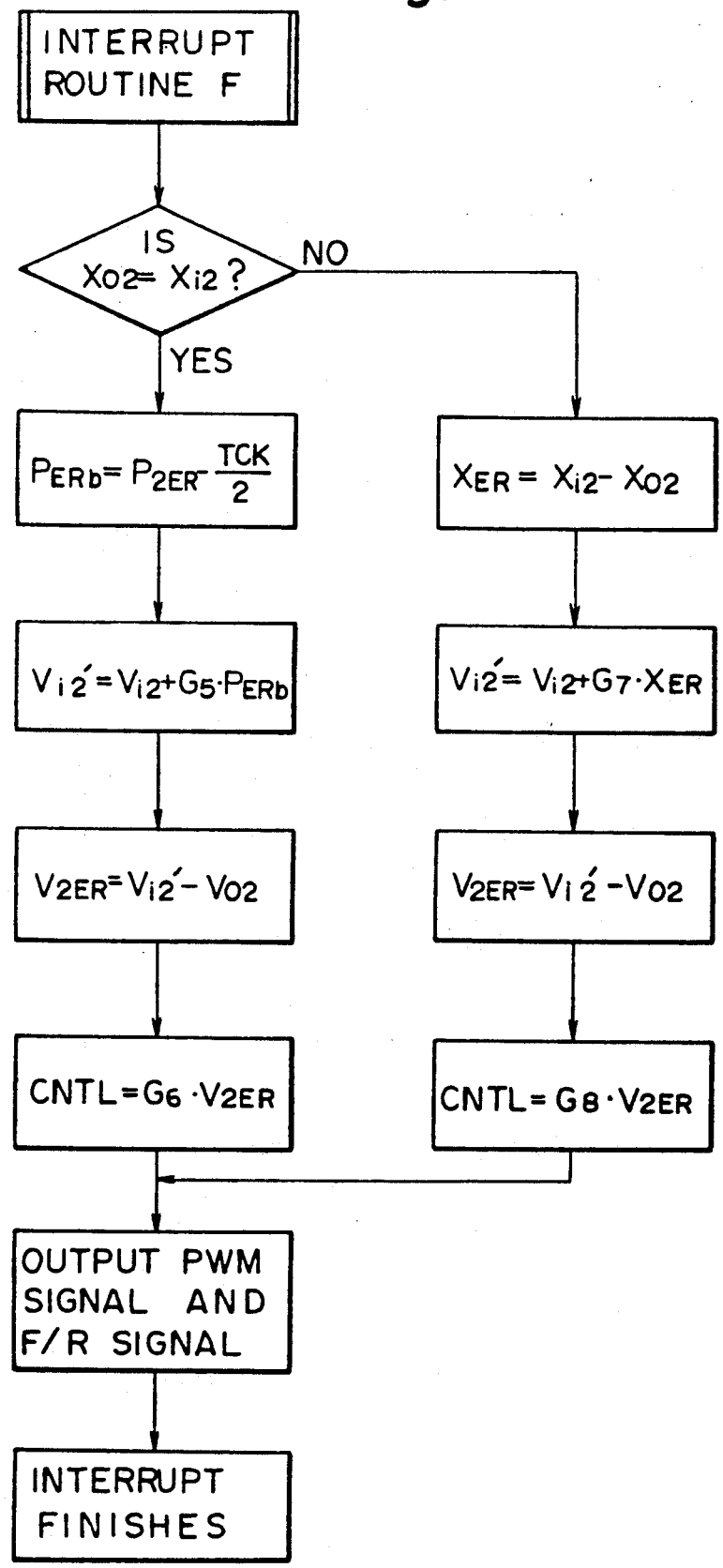
FIG. 20 is a flowchart showing an interrupt routine F included in the constant state routine.

In addition, no description will be directed to the interrupt routine F (see FIG. 20) executed each time the digital position data $X_{02}$ is updated, because it is the same as the routine E as shown in FIG. 19.

In the routine for the constant speed state, when the position deviations of the linear motors 10a, 10b in the constant speed state γ are ±200 μm or smaller, these linear motors are subject to the PLL speed control. When the position deviations are larger than ±200 μm, they are subject to the normal speed control for the purpose of simplifying the program. If it is desirous that these motors are subject to the PLL speed control even when the position deviations are more than ±200 μm, the routine enclosed by a dotted line in FIG. 19 should be replaced.

In those routines, $G_1$ to $G_8$ denote any servo gain.

The foregoing process thus allows the linear motor 10a to stably travel at a speed twice as fast as the linear motor 10b without slipping both motors out of the proper positional relation. This is an excellent control characteristic. In other words, this control characteristic enables the optical distance to be kept constant irrespective of the scanning position, resulting in advantageously allowing the duplicating machine to offer a properly-focused duplicating image.

When the constant speed state routines are executed step by step, if the digital position instruction data $X_{i1}$ is equal to $X_E$, the process proceeds to the in-return accelerating routine (S24) as shown in FIG. 17. This routine will be discussed with reference to FIG. 21. In the discussion, TBL3(n) and TBL4(n) denote the contents of data read out of the linear speed tables 20a, 20b when the digital position instruction data $X_{i1}$, $X_{02}$ respectively denote n.

(4) In-return Accelerating State ε

Figure 21:
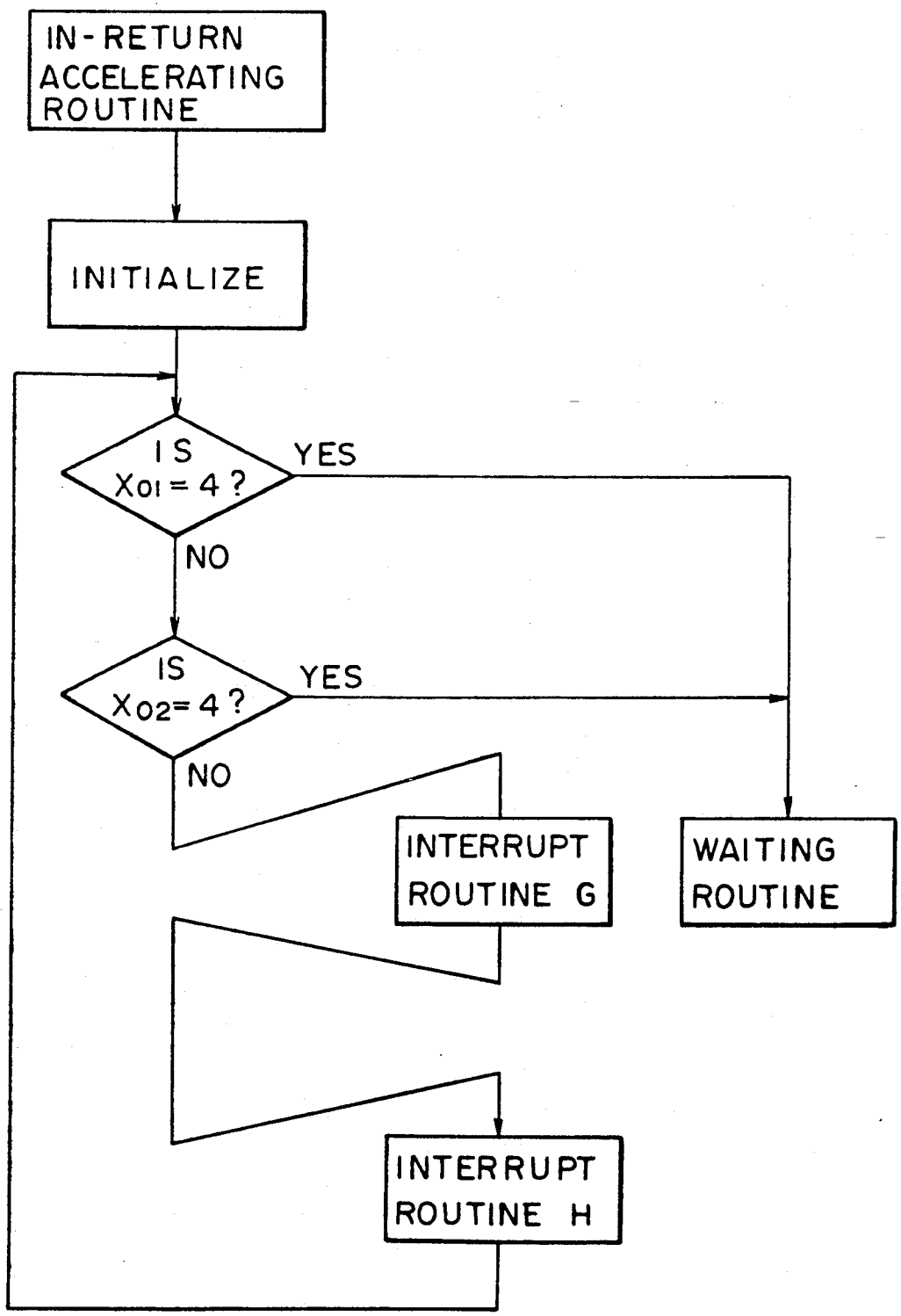
FIG. 21 is a flowchart showing an in-return accelerating routine.

When the process proceeds to the in-return accelerating state ε, the PWM signal and the F/R signal are respectively output in a manner to allow these linear motors 10a, 10b to be reversely travelled at the maximum thrust. This routine is designed to iteratively execute an interrupt routine G and an interrupt routine H unless any one of the digital position data $X_{01}$, $X_{02}$ is equal to 4 as shown in FIG. 21.

Figure 22:
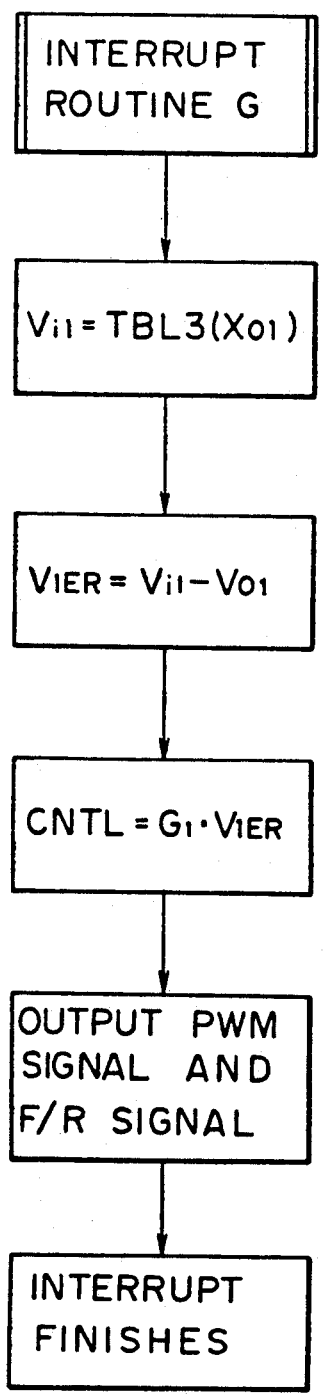
FIG. 22 is a flowchart showing an interrupt routine G included in the accelerating state in return routine.

With reference to FIG. 22, the interrupt routine G is discussed in detail. When the updated digital position data $X_{i1}$ is sent to the interrupt routine G, the TBL3($X_{01}$) is read out of the speed table 20a and is assumed as digital desired speed data $V_{i1}$. At the next step, the digital speed data $V_{01}$ is subtracted from the digital desired speed data $V_{i1}$ for deriving the digital speed deviation data $V_{1ER}$. Then, the CNTL data is derived using the digital speed deviation data $V_{1ER}$. At the next step, the PWM signal and the F/R signal matching to the magnitude and the sign of the CNTL data are respectively output and then the interrupt routine G finishes.

In addition, no description will be directed to the interrupt routine H (see FIG. 23) executed each time the digital position data $X_{iz}$ is updated, because the routine H is the same as the foregoing interrupt routine G.

While the in-return accelerating routine is being executed, if any one of the digital position data $X_{01}$, $X_{02}$ is equal to 4, the waiting routine as described above is started.

Figure 23:
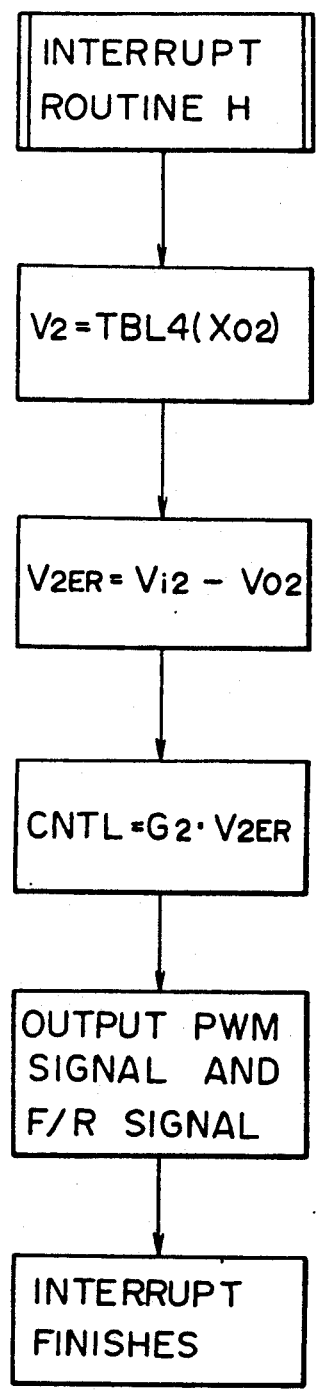
FIG. 23 is a flowchart showing an interrupt routine H included in the accelerating state in return routine.

Immediately before each initial position of the linear motors 10a, 10b (the distance from the initial position matching to four pitches of the encoders 4a, 4b), the speed control is switched from a digital to an analog control. It results in advantageously allowing the linear motors 10a, 10b to travel back at a high speed as well as keeping the positioning precision of an origin proper. In FIGS. 22 and 23, $G_1$ and $G_2$ denote any servo gain.

The electronic duplicating machine employing the PL speed control circuit, therefore, makes it possible to speed up duplication and upgrade a duplicating image. It can provide a high-efficient device.

Many widely different embodiments of the present invention may be constructed without departing from the spirit and scope of the present invention. It should be understood that the present is not limited to the specific embodiments described in the specification, except as defined in the appended claims. For example, it may be applied to an X-Y table where 2 or more objects are driven in synchronization. Further, this circuit may employ pure hardware configuration, not the software configuration.

What is claimed is:

1. A phase locked loop speed control circuit for controlling the speeds of two or more objects, comprising:
    clock pulse generator means for respectively generating reference pulses for said two or more objects, said clock pulse generator means including a clock pulse generator for generating clock pulses used for a time base and reference clock pulse generators for dividing the clock pulses output by said clock pulse generator for producing the reference pulses corresponding to desired speeds of said two or more objects;
    first counting means for counting the corresponding reference pulses output by said reference clock pulse generators;
    encoder means for detecting the corresponding relative movements of said objects to provide respective encoder pulses;
    second counting means for counting the corresponding encoder pulses output by said encoder means;
    first subtractor means for subtracting each count of said second counting means from each count of said first counting means for producing position deviations of said objects;
    second subtractor means for subtracting each encoder pulse of said encoder means from each respective reference pulse of said reference clock pulse generators for producing phase differences of said objects;
    correcting means for correcting said phase differences; and
    adjusting means for adjusting the movement of said objects based on the results output by said correcting means.

2. The phase locked loop speed control circuit as claimed in claim 1, wherein said objects are linear motors.

3. The phase locked loop speed control circuit as claimed in claim 3 further including a one-chip microcomputer having a stored program to independently control the speed of each of said linear motors in a cyclic manner from a waiting state, an accelerating state, a constant speed state, and an accelerating state in return to the original waiting state.

4. A phase locked loop speed control circuit for controlling first and second objects at a predetermined speed ratio, comprising:
    a clock pulse generator for generating a time-reference clock pulse used for controlling the speeds of said first and second objects;
    first and second reference pulse generators for dividing the clock pulse output by said clock pulse generator for respectively generating first and second reference pulses respectively corresponding to said first and second objects;

first and second stroke position instruction sections for respectively counting the first and second reference pulses output by said first and second reference pulse generators;

first and second linear encoders for respectively detecting the relative movements of said first and second objects to provide first and second encoder pulses, respectively;

first and second stroke position detectors for respectively counting the first and second encoder pulses output by said first and second linear encoders;

first and second position deviation deriving sections for respectively subtracting each digital value counted by the first and second stroke position detectors from each digital value counted by the first and the second stroke position instruction sections to provide position deviation digital values;

first and second phase difference deriving sections for respectively subtracting each of the first and second encoder pulses output by said first and second linear encoders from each of said first and second reference pulses to provide respective phase differences;

first and second phase difference correcting sections for respectively operating predetermined equations of $2\pi X_{1ER}+P_{1ER}$ and $2\pi X_{2ER}+P_{2ER}$, where $X_{1ER}$ and $X_{2ER}$ denote the position deviation digital values derived by said first and second position deviation deriving sections, and $P_{1ER}$ and $P_{2ER}$ denote the phase differences derived by said first and second phase difference deriving sections, for correcting said phase differences; and first and second adjusting sections for respectively adjusting each control amount of said first and second phase objects based on the operating results of said first and second phase difference correcting sections.

5. The phase locked loop speed control circuit as claimed in claim 4, wherein said first and second objects are linear motors.

6. The phase locked loop speed control circuit as claimed in claim 4 further including a one-chip microcomputer having a stored program to independently control the speed of each of said linear motors in a cyclic manner from a waiting state, an accelerating state, a constant speed state, and an accelerating state in return to the original waiting state.

7. The phase locked loop speed control circuit as claimed in claim 4, wherein for said waiting state, two interrupt routines are executed unless a start signal becomes active.

8. The phase locked loop speed control circuit as claimed in claim 4, wherein for said accelerating state, a timer-interrupt routine and two interrupt routines are executed unless the digital position instruction data becomes equal to a predetermined position data indicating a specified position of said linear motor.

9. The phase locked loop speed control circuit as claimed in claim 6, wherein for said constant speed state, a timer-interrupt routine and two interrupt routines are executed unless the digital position instruction data becomes equal to another predetermined position data indicating another specified position of said linear motor.

10. The phase locked loop speed control circuit as claimed in claim 6, wherein for said accelerating state in return, two interrupt routines are executed unless any one of both said predetermined position data reaches a predetermined value.

* * * * *